United States Patent
Xu et al.

(10) Patent No.: US 10,314,029 B2
(45) Date of Patent: Jun. 4, 2019

(54) DOWNLINK CHANNEL DESIGN FOR LTE WITH LOW LATENCY

(71) Applicant: QUALCOMM Incorporated, San Diego, CA (US)

(72) Inventors: Hao Xu, Beijing (CN); Peter Gaal, San Diego, CA (US); Wanshi Chen, San Diego, CA (US); Shimman Arvind Patel, San Diego, CA (US); Durga Prasad Malladi, San Diego, CA (US); Yongbin Wei, San Diego, CA (US); Aleksandar Damnjanovic, Del Mar, CA (US); Onkar Dabeer, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/711,470

(22) Filed: Sep. 21, 2017

(65) Prior Publication Data

US 2018/0027534 A1 Jan. 25, 2018

Related U.S. Application Data

(63) Continuation of application No. 14/836,183, filed on Aug. 26, 2015, now Pat. No. 9,794,922.
(Continued)

(51) Int. Cl.
*H04J 3/00* (2006.01)
*H04W 72/04* (2009.01)
(Continued)

(52) U.S. Cl.
CPC ............. *H04W 72/042* (2013.01); *H04L 1/00* (2013.01); *H04L 5/0044* (2013.01);
(Continued)

(58) Field of Classification Search
CPC ........... H04W 72/0446; H04W 72/042; H04W 72/0406; H04L 5/0053; H04L 5/0044
See application file for complete search history.

(56) References Cited

U.S. PATENT DOCUMENTS

2009/0323625 A1* 12/2009 Lee .................... H04W 72/042
370/329
2012/0147839 A1 6/2012 Yin et al.
(Continued)

FOREIGN PATENT DOCUMENTS

WO WO-2012/147295 A1 11/2012
WO WO-2013/162247 A1 10/2013

OTHER PUBLICATIONS

HTC: "E-PDCCH Design Considerations on Multiplexing with PDSCH", 3GPP Draft; R1-120266, 3rd Generation Partnership Project (3GPP), Mobile Competence Centre ; 650, Route Des Lucioles ; F-06921 Sophia-Antipolis Cedex ; France, vol. RAN WG1, No. Dresden, Germany; Feb. 6, 2012-Feb. 10, 2012, Feb. 1, 2012 (Feb. 1, 2012), XP050563176, [retrieved on Feb. 1, 2012]. 4 pages.
(Continued)

*Primary Examiner* — Shukri Taha
(74) *Attorney, Agent, or Firm* — Anthony R. Morris

(57) ABSTRACT

An example data structure for managing user equipment communications in a wireless communications system is presented, as well as methods and apparatuses configured to implement the data structure. For instance, the data structure may include a downlink subframe comprising two slots and including one or more quick downlink channels having a single-slot transmission time interval. In addition, the example data structure may include one or more resource element blocks each comprising one or more resource elements into which a frequency bandwidth is divided within one or both of the two slots, wherein each of the one
(Continued)

or more resource element blocks comprises a control channel region or a data channel region. Furthermore, the example data structure may include one or more resource grants, located within one or more control channel regions, for one or more user equipment served by the one or more quick downlink channels.

30 Claims, 14 Drawing Sheets

Related U.S. Application Data

(60) Provisional application No. 62/056,347, filed on Sep. 26, 2014.

(51) Int. Cl.
  *H04W 72/14* (2009.01)
  *H04L 1/00* (2006.01)
  *H04L 5/00* (2006.01)
  *H04W 88/02* (2009.01)

(52) U.S. Cl.
  CPC ....... *H04L 5/0064* (2013.01); *H04W 72/0446* (2013.01); *H04W 72/14* (2013.01); *H04L 5/0007* (2013.01); *H04W 88/02* (2013.01)

(56) References Cited

U.S. PATENT DOCUMENTS

| | | |
|---|---|---|
| 2012/0230290 A1 | 9/2012 | Seo et al. |
| 2013/0114525 A1* | 5/2013 | Ahmadi ................ H04L 5/0053 370/329 |
| 2015/0110029 A1 | 4/2015 | Hwang et al. |
| 2015/0155928 A1* | 6/2015 | Seo ........................ H04L 5/0053 370/329 |
| 2015/0156670 A1* | 6/2015 | Jonsson .............. H04L 25/0226 455/502 |
| 2016/0095094 A1 | 3/2016 | Xu |

OTHER PUBLICATIONS

International Search Report and Written Opinion—PCT/US2015/047118—ISA/EPO—dated Nov. 24, 2015. 15 pages.
LG Electronics, "Concept of E-PDCCH CCE", 3GPP Draft; R1-120454 LG Concept of E-PDCCH CCE, 3rd Generation Partnership Project (3GPP), Mobile Competence Centre ; 650, Route Des Lucioles ; F-06921 Sophia-Antipolis Cedex ; France, val. RAN WG1, No. Dresden, Germany; Feb. 6, 2012-Feb. 10, 2012, Jan. 31, 2012 (Jan. 31, 2012 ), XP050562941, [retrieved on Jan. 31, 2012]. 3 pages.

* cited by examiner

DOWNLINK CHANNEL DESIGN FOR LTE WITH LOW LATENCY

CROSS-REFERENCE TO RELATED APPLICATION

The present Application for Patent is a Continuation Application of U.S. application Ser. No. 14/836,183, filed Aug. 26, 2015, entitled "DOWNLINK CHANNEL DESIGN FOR LTE WITH LOW LATENCY," which claims priority to Provisional Application No. 62/056,347 entitled "DOWNLINK CHANNEL DESIGN FOR LTE WITH LOW LATENCY" filed Sep. 26, 2014, all of which are assigned to the assignee hereof and hereby expressly incorporated by reference herein for all purposes.

BACKGROUND

The present disclosure relates generally to communication systems, and more particularly, to a downlink frame structure and method of downlink transmission for managing communications with one or more user equipment (UE) in a wireless communications system.

Wireless communications systems are widely deployed to provide various telecommunication services such as telephony, video, data, messaging, and broadcasts. Typical wireless communications systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

In wireless communications systems employing legacy LTE, a plurality of UEs served by a particular eNodeB may receive data from the eNodeB over a shared downlink channel called the Physical Downlink Shared Channel (PDSCH). In addition, control information associated with the PDSCH or may be transmitted to the UEs by the eNodeB via a Physical Downlink Control Channel (PDCCH) and/or an Enhanced PDCCH (ePDCCH). The control information included in the PDCCH or ePDCCH may include one or more uplink or downlink resource element (RE) grants for an LTE subframe. In legacy LTE, each LTE subframe has a transmission time interval (TTI) of 1 ms and is divided into two 0.5 ms slots. Any RE grants transmitted on the PDCCH, however, are for a remaining duration of the entire subframe (i.e., the full remainder of 1 ms). As such, legacy LTE does not allow for resource scheduling at a level of granularity less than a full 1 ms LTE subframe, even if faster downlink communication rates are desired for a particular communication flow.

As such, improvements in the downlink frame structure and downlink transmission methods are needed.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various techniques are described in connection with example data structures, methods, and apparatuses for improving wireless communication speed and reliability between one or more UEs and network entities in wireless communication networks.

For instance, in an aspect of the present disclosure, an example data structure for managing user equipment communications in a wireless communications system is described. The example data structure may include a downlink subframe comprising two slots and including one or more quick downlink channels having a single-slot TTI. Additionally, the example data structure may include one or more resource element blocks each comprising one or more resource elements into which a frequency bandwidth is divided within one or both of the two slots, wherein each of the one or more resource element blocks comprises a control channel region or a data channel region. Furthermore, the example data structure may include one or more resource grants, located within one or more control channel regions, for one or more user equipment served by the one or more quick downlink channels.

In a further aspect, the present disclosure presents an example method of managing UE communications in a wireless communications system, and may include obtaining, at a network entity, user data for transmission to one or more user equipment UEs on a downlink channel. The example method may further include determining one or more delivery constraints associated with at least one of the user data and the one or more UEs. Moreover, the example method may include generating, based on the user data for transmission and the one or more delivery constraints, a downlink subframe data structure for allocating downlink channel resources for transmission of the user data for transmission. In the example method, the downlink subframe data structure may include a downlink subframe comprising two slots and including one or more quick downlink channels having a single-slot TTI. Furthermore, the example downlink subframe data structure may further include one or more resource element blocks each comprising one or more resource elements into which a frequency bandwidth is divided within one or both of the two slots, wherein each of the one or more resource element blocks comprises a control channel region or a data channel region and one or more resource grants, located within one or more control channel regions, for the one or more UEs served by the one or more quick downlink channels.

Moreover, the present disclosure describes an example apparatus for managing UE communications in a wireless communications system, and may include means for obtaining, at a network entity, user data for transmission to one or more user equipment UEs on a downlink channel. The example apparatus may further include means for determining one or more delivery constraints associated with at least one of the user data and the one or more UEs. Moreover, the example apparatus may include means for generating, based on the user data for transmission and the one or more delivery constraints, a downlink subframe data structure for allocating downlink channel resources for transmission of the user data for transmission. In the example apparatus, the downlink subframe data structure may include a downlink subframe comprising two slots and including one or more quick downlink channels having a single-slot TTI. Furthermore, the example downlink subframe data structure may further include one or more resource element blocks each comprising one or more resource elements into which a frequency bandwidth is divided within one or both of the two slots, wherein each of the one or more resource element blocks comprises a control channel region or a data channel region and one or more resource grants, located within one or more control channel regions, for the one or more UEs served by the one or more quick downlink channels.

In an additional aspect, an example apparatus for managing UE communications in a wireless communications system is presented, which may include a processor and a memory coupled to the processor. In some examples, the memory may store processor-executable instructions, that when executed by the processor, cause the processor to obtain, at a network entity, user data for transmission to one or more UEs on a downlink channel. Additionally, the memory may store processor-executable instructions, that when executed by the processor, cause the processor to determine one or more delivery constraints associated with at least one of the user data and the one or more UEs. In addition, the memory may store processor-executable instructions, that when executed by the processor, cause the processor to generate, based on the user data for transmission and the one or more delivery constraints, a downlink subframe data structure for allocating downlink channel resources for transmission of the user data for transmission. According to the example apparatus, the downlink subframe data structure may include a downlink subframe comprising two slots and including one or more quick downlink channels having a single-slot TTI. In addition, the downlink subframe data structure may include one or more resource element blocks each comprising one or more resource elements into which a frequency bandwidth is divided within one or both of the two slots, wherein each of the one or more resource element blocks comprises a control channel region or a data channel region. Furthermore, the downlink subframe data structure may include one or more resource grants, located within one or more control channel regions, for the one or more UEs served by the one or more quick downlink channels.

Moreover, the disclosure presents an example computer-readable medium storing computer-executable code for managing UE communications in a wireless communications system. In an aspect, the computer-executable code may include code for obtaining, at a network entity, user data for transmission to one or more user equipment UEs on a downlink channel. In addition, the computer-executable code may include code for determining one or more delivery constraints associated with at least one of the user data and the one or more UEs. Furthermore, the computer-executable code may include code for generating, based on the user data for transmission and the one or more delivery constraints, a downlink subframe data structure for allocating downlink channel resources for transmission of the user data for transmission. According to the example computer-readable medium, the downlink subframe data structure may include a downlink subframe comprising two slots and including one or more quick downlink channels having a single-slot TTI. The downlink subframe data structure may also include one or more resource element blocks each comprising one or more resource elements into which a frequency bandwidth is divided within one or both of the two slots, wherein each of the one or more resource element blocks comprises a control channel region or a data channel region. Additionally, the downlink subframe data structure may include one or more resource grants, located within one or more control channel regions, for the one or more UEs served by the one or more quick downlink channels.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
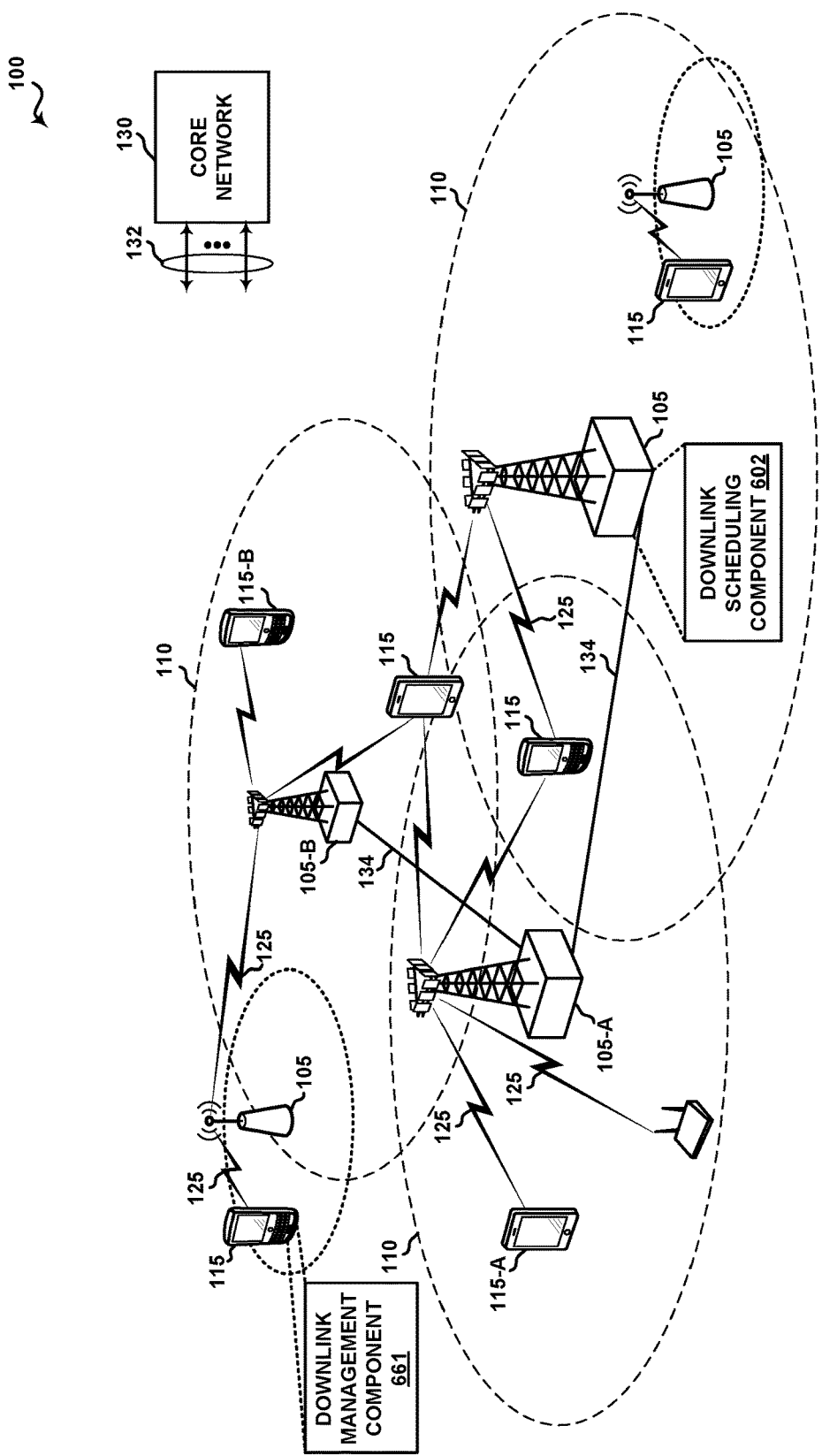
FIG. 1 shows a block diagram conceptually illustrating an example of a telecommunications system, in accordance with an aspect of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The present disclosure presents example data structures and transmission methods for managing downlink communications to one or more UEs, and in particular, to reduce latency as compared to legacy downlink data structures and downlink transmission methods. These data structures of the present disclosure may include one or more resource element blocks into which a frequency bandwidth of one or more downlink channels is divided within a slot of an LTE subframe. Likewise, any REs of the subframe may have an assignment that lasts for a single slot in the subframe or for the entire subframe.

In addition, any of the resource element blocks of a particular slot may comprise a control channel region or a data channel region. A control channel region may include one or more resource grants associated with one or more UEs served by a network entity (e.g., an eNodeB). Such resource grants may include one or more downlink resource grants and/or one or more uplink resource grants. For example, in one aspect of the present disclosure, a control channel region located in the first symbol (or first few symbols) of a subframe may be utilized for scheduling downlink frequency grants in data channel region that comprises the remainder of the first slot of the subframe or for the remainder of the entire subframe. For purposes of the present disclosure, the control channel corresponding to such a control channel region may be referred to as a Quick Physical Downlink Control Channel (QPDCCH).

In another aspect of the present disclosure, a control channel region may include a resource element block spanning an entire single slot (or a portion thereof) and may be utilized for scheduling downlink frequency grants for one or more other resource element blocks in the same slot. For purposes of the present disclosure, the control channel corresponding to such a control channel region may be referred to as a Quick Enhanced Physical Downlink Control Channel (QEPDCCH).

Furthermore, a data channel region of the present disclosure may include a resource element block spanning an entire single slot (or a portion thereof) during which user data is transmitted to a UE receiving a downlink grant in a control channel region (e.g., corresponding to a QPDCCH or a QEPDCCH). For purposes of the present disclosure, the data channel corresponding to such a data channel region may be referred to as a Quick Physical Downlink Shared Channel (QPDSCH).

Additionally, for purposes of the present disclosure, any channel that may have a temporal length (e.g., TTI) of a single slot (or a portion of a single slot) or includes resource grants for a data channel having a temporal length of a single slot (or a portion of a single slot) may be referred to herein as a "Quick LTE channel." These Quick LTE channels may include, in a non-limiting aspect, a QPDCCH, a QEPDCCH, and a QPDSCH. Furthermore, any reference to "Quick LTE" in the present disclosure may refer to a data structure for resource element scheduling (or a method or apparatus implementing the data structure) having one or more channels or resource element blocks that are or can be allocated, assigned, or divided on a per-slot basis and/or have a TTI of 0.5 ms. Such references to Quick LTE may include "Quick LTE scheduling," "Quick LTE scheme," or the like.

Moreover, the example data structures of the present disclosure are configured to additionally implement frame scheduling of legacy LTE channels (e.g., PDCCH, EPDCCH, PDSCH) alongside the slot-specific RE allocation aspects introduced by the present disclosure for corresponding Quick LTE channels (e.g., QPDCCH, QEPDCCH, QPDSCH). In this way, the data structures described herein may be implemented for UEs or specific UE applications that are configured to utilize Quick LTE scheduling (per-slot scheduling) and/or legacy LTE scheduling (per-subframe scheduling). As the Quick LTE scheduling methods described herein may utilize a 0.5 ms TTI rather than the 1 ms TTI of legacy LTE, these methods may increase communication rates two-fold and may cut a round-trip time (RTT) associated with legacy LTE hybrid automatic repeat request (HARD) procedures in half (e.g., from 8 ms to 4 ms or less).

In an additional aspect of the present disclosure, a network entity (e.g., an eNodeB) is presented, which may be configured to manage downlink scheduling by generating one or more of the data structures disclosed herein. Furthermore, the network entity may be configured to obtain data for transmission to one or more UEs and may schedule the transmission of the data using the data structure based on the data and/or delivery constraints associated with the one or more UEs.

Referring first to FIG. 1, a diagram illustrates an example of a wireless communications system 100, in accordance with an aspect of the present disclosure. The wireless communications system 100 includes a plurality of access points (e.g., base stations, eNBs, or WLAN access points) 105, a number of user equipment (UEs) 115, and a core network 130. Access points 105 may include a downlink scheduling component 602 configured to expedite communication of control information and user data with the number of UEs 115 using an Quick LTE data structure, for example but not limited to data structure 700 of FIG. 7, below, which may include a TTI of one slot for some RE blocks. For example, the Quick LTE data structure may include one or more resource element blocks for allocating a PDCCH, EPDCCH, PDSCH, QPDCCH, QEPDCCH, and/or QPDSCH. Similarly, one or more of UEs 115 may include a downlink management component 661 configured to receive, decode and operate using the data structure. Some of the access points 105 may communicate with the UEs 115 under the control of a base station controller (not shown), which may be part of the core network 130 or the certain access points 105 (e.g., base stations or eNBs) in various examples. Access points 105 may communicate control information and/or user data with the core network 130 through backhaul links 132. In examples, the access points 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

In some examples, at least a portion of the wireless communications system 100 may be configured to operate on multiple hierarchical layers in which one or more of the UEs 115 and one or more of the access points 105 may be configured to support transmissions on a hierarchical layer that has a reduced latency with respect to another hierarchical layer. In some examples a hybrid UE 115-a may communicate with access point 105-a on both a first hierarchical layer that supports first layer transmissions with a first subframe type and a second hierarchical layer that supports second layer transmissions with a second subframe type. For example, access point 105-a may transmit subframes of the second subframe type that are time division duplexed with subframes of the first subframe type.

In some examples, hybrid UE 115-a may acknowledge receipt of a transmission by providing ACK/NACK for the transmission through, for example, a HARQ scheme. Acknowledgments from hybrid UE 115-a for transmissions in the first hierarchical layer may be provided, in some examples, after a predefined number of subframes following the subframe in which the transmission was received. The hybrid UE 115-a, when operating in the second hierarchical layer may, in examples, acknowledge receipt in a same subframe as the subframe in which the transmission was received. The time required to transmit an ACK/NACK and receive a retransmission may be referred to as round trip time (RTT), and thus subframes of the second subframe type may have a second RTT that is shorter than a RTT for subframes of the first subframe type.

In other examples, a second layer UE 115-b may communicate with access point 105-b on the second hierarchical layer only. Thus, hybrid UE 115-a and second layer UE 115-b may belong to a second class of UEs 115 that may communicate on the second hierarchical layer, while legacy UEs 115 may belong to a first class of UEs 115 that may communicate on the first hierarchical layer only. Access point 105-b and UE 115-b may communicate on the second hierarchical layer through transmissions of subframes of the second subframe type. Access point 105-b may transmit subframes of the second subframe type exclusively, or may transmit one or more subframes of the first subframe type on the first hierarchical layer that are time division multiplexed with subframes of the second subframe type. Second layer UE 115-b, in the event that access point 105-b transmits subframes of the first subframe type, may ignore such subframes of the first subframe type. Thus, second layer UE 115-b may acknowledge receipt of transmissions in a same subframe as the subframe in which the transmissions are received. Thus, second layer UE 115-b may operate with reduced latency compared to UEs 115 that operate on the first hierarchical layer.

The access points 105 may wirelessly communicate with the UEs 115 via one or more access point antennas. Each of the access points 105 sites may provide communication coverage for a respective coverage area 110. In some examples, access points 105 may be referred to as a base transceiver station, a radio base station, a radio transceiver, a basic service set (BSS), an extended service set (ESS), a NodeB, eNodeB, Home NodeB, a Home eNodeB, or some other suitable terminology. The coverage area 110 for a base station may be divided into sectors making up only a portion of the coverage area (not shown). The wireless communications system 100 may include access points 105 of different types (e.g., macro, micro, and/or pico base stations). The access points 105 may also utilize different radio technologies, such as cellular and/or WLAN radio access technologies. The access points 105 may be associated with the same or different access networks or operator deployments. The coverage areas of different access points 105, including the coverage areas of the same or different types of access points 105, utilizing the same or different radio technologies, and/or belonging to the same or different access networks, may overlap.

In LTE/LTE-A network communication systems, the terms evolved Node B (eNodeB or eNB) may be generally used to describe the access points 105. The wireless communications system 100 may be a Heterogeneous LTE/LTE-A/ULL LTE network in which different types of access points provide coverage for various geographical regions. For example, each access point 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs 115 with service subscriptions with the network provider. A small cell would generally cover a relatively smaller geographic area and may allow unrestricted access by UEs 115 with service subscriptions with the network provider, for example, and in addition to unrestricted access, may also provide restricted access by UEs 115 having an association with the small cell (e.g., UEs in a closed subscriber group (CSG), UEs for users in the home, and the like). An eNB for a macro cell may be referred to as a macro eNB. An eNB for a small cell may be referred to as a small cell eNB. An eNB may support one or multiple (e.g., two, three, four, and the like) cells.

The core network 130 may communicate with the eNBs or other access points 105 via a backhaul 132 (e.g., S1 interface, etc.). The access points 105 may also communicate with one another, e.g., directly or indirectly via backhaul links 134 (e.g., X2 interface, etc.) and/or via backhaul links 132 (e.g., through core network 130). The wireless communications system 100 may support synchronous or asynchronous operation. For synchronous operation, the access points 105 may have similar frame timing, and transmissions from different access points 105 may be approximately aligned in time. For asynchronous operation, the access points 105 may have different frame timing, and transmissions from different access points 105 may not be aligned in time. Furthermore, transmissions in the first hierarchical layer and second hierarchical layer may or may not be synchronized among access points 105. The techniques described herein may be used for either synchronous or asynchronous operations.

The UEs 115 are dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNodeBs, small cell eNodeBs, relays, and the like. A UE 115 may also be able to communicate over different access networks, such as cellular or other WWAN access networks, or WLAN access networks.

The communication links 125 shown in wireless communications system 100 may include uplink (UL) transmissions from a UE 115 to an access point 105, and/or downlink (DL) transmissions, from an access point 105 to a UE 115. The downlink transmissions may also be called forward link transmissions while the uplink transmissions may also be called reverse link transmissions. The communication links 125 may carry transmissions of each hierarchical layer which, in some examples, may be multiplexed in the communication links 125. The UEs 115 may be configured to collaboratively communicate with multiple access points 105 through, for example, Multiple Input Multiple Output (MIMO), carrier aggregation (CA), Coordinated Multi-Point (CoMP), or other schemes. MIMO techniques use multiple antennas on the access points 105 and/or multiple antennas on the UEs 115 to transmit multiple data streams. Carrier aggregation may utilize two or more component carriers on a same or different serving cell for data transmission. CoMP may include techniques for coordination of transmission and reception by a number of access points 105 to improve overall transmission quality for UEs 115 as well as increasing network and spectrum utilization.

As mentioned, in some examples access points 105 and UEs 115 may utilize carrier aggregation to transmit on multiple carriers. In some examples, access points 105 and UEs 115 may concurrently transmit in a first hierarchical layer, within a frame, one or more subframes each having a first subframe type using two or more separate carriers. Each carrier may have a bandwidth of, for example, 20 MHz, although other bandwidths may be utilized. Hybrid UE 115-a, and/or second layer UE 115-b may, in certain examples, receive and/or transmit one or more subframes in a second hierarchical layer utilizing a single carrier that has a bandwidth greater than a bandwidth of one or more of the separate carriers. For example, if four separate 20 MHz carriers are used in a carrier aggregation scheme in the first hierarchical layer, a single 80 MHz carrier may be used in the second hierarchical layer. The 80 MHz carrier may occupy a portion of the radio frequency spectrum that at least partially overlaps the radio frequency spectrum used by one or more of the four 20 MHz carriers. In some examples, scalable bandwidth for the second hierarchical layer type may be combined techniques to provide shorter RTTs such as described above, to provide further enhanced data rates.

Each of the different operating modes that may be employed by wireless communications system 100 may operate according to frequency division duplexing (FDD) or time division duplexing (TDD). In some examples, different hierarchical layers may operate according to different TDD or FDD modes. For example, a first hierarchical layer may operate according to FDD while a second hierarchical layer may operate according to TDD. In some examples, OFDMA communications signals may be used in the communication links 125 for LTE downlink transmissions for each hierarchical layer, while single carrier frequency division multiple access (SC-FDMA) communications signals may be used in the communication links 125 for LTE uplink transmissions in each hierarchical layer. Additional details regarding implementation of hierarchical layers in a system such as the wireless communications system 100, as well as other features and functions related to communications in such systems, are provided below with reference to the following figures.

Figure 2:
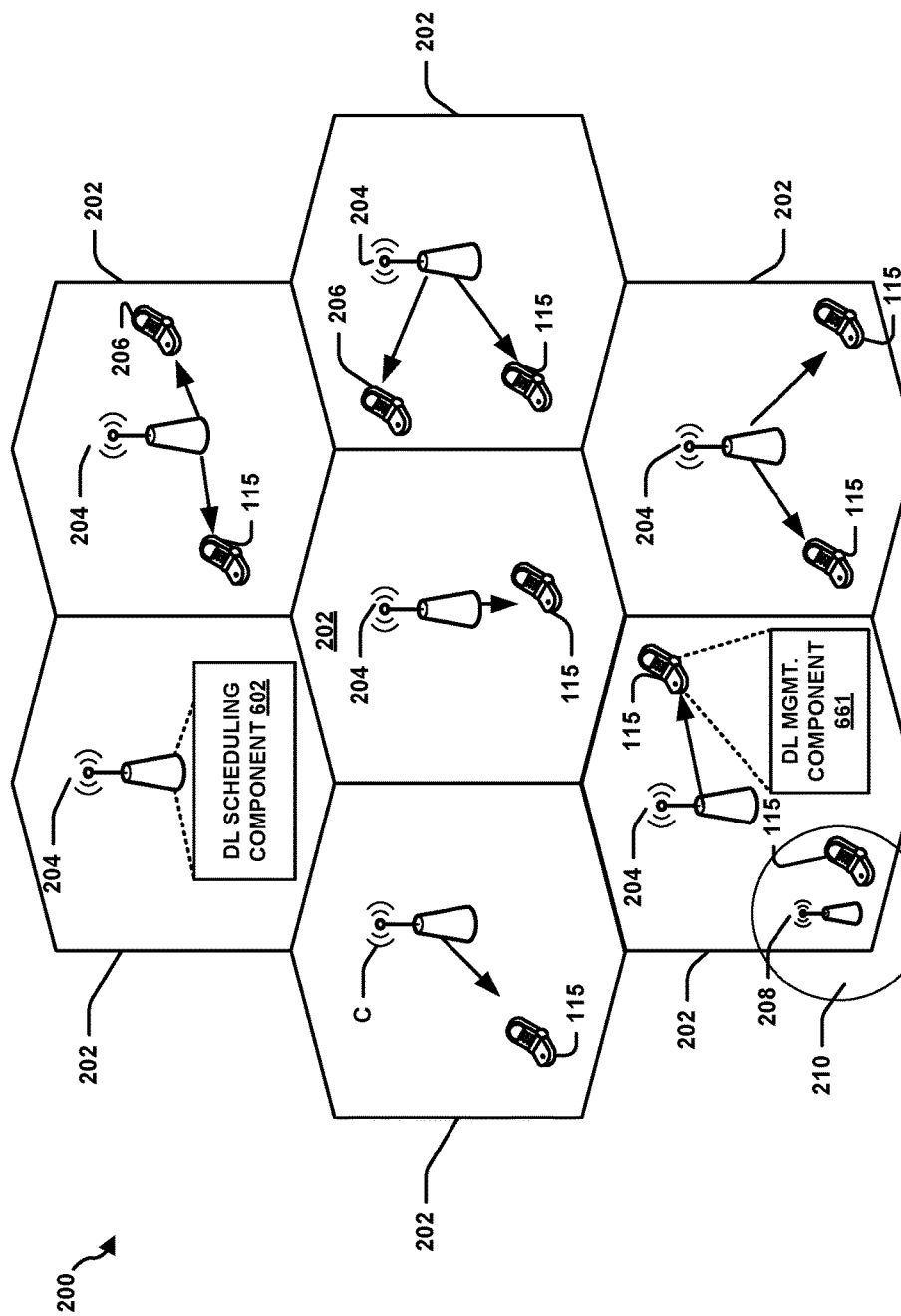
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the Evolved Packet Core for all the UEs 115 (see FIG. 1) in the cells 202. In an aspect, eNBs 204 may constitute an access point 105 of FIG. 1 and may include a downlink scheduling component 602 configured to expedite communication of control information and user data with the number of UEs 115 using an Quick LTE data structure, for example but not limited to data structure 700 of FIG. 7, which may include a TTI of one slot for some RE blocks. Similarly, one or more of UEs 115 may include a downlink management component 661 configured to receive, decode and operate using the data structure. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 115 to increase the data rate or to multiple UEs 115 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 115 with different spatial signatures, which enables each of the UE(s) 115 to recover the one or more data streams destined for that UE 115. On the UL, each UE 115 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
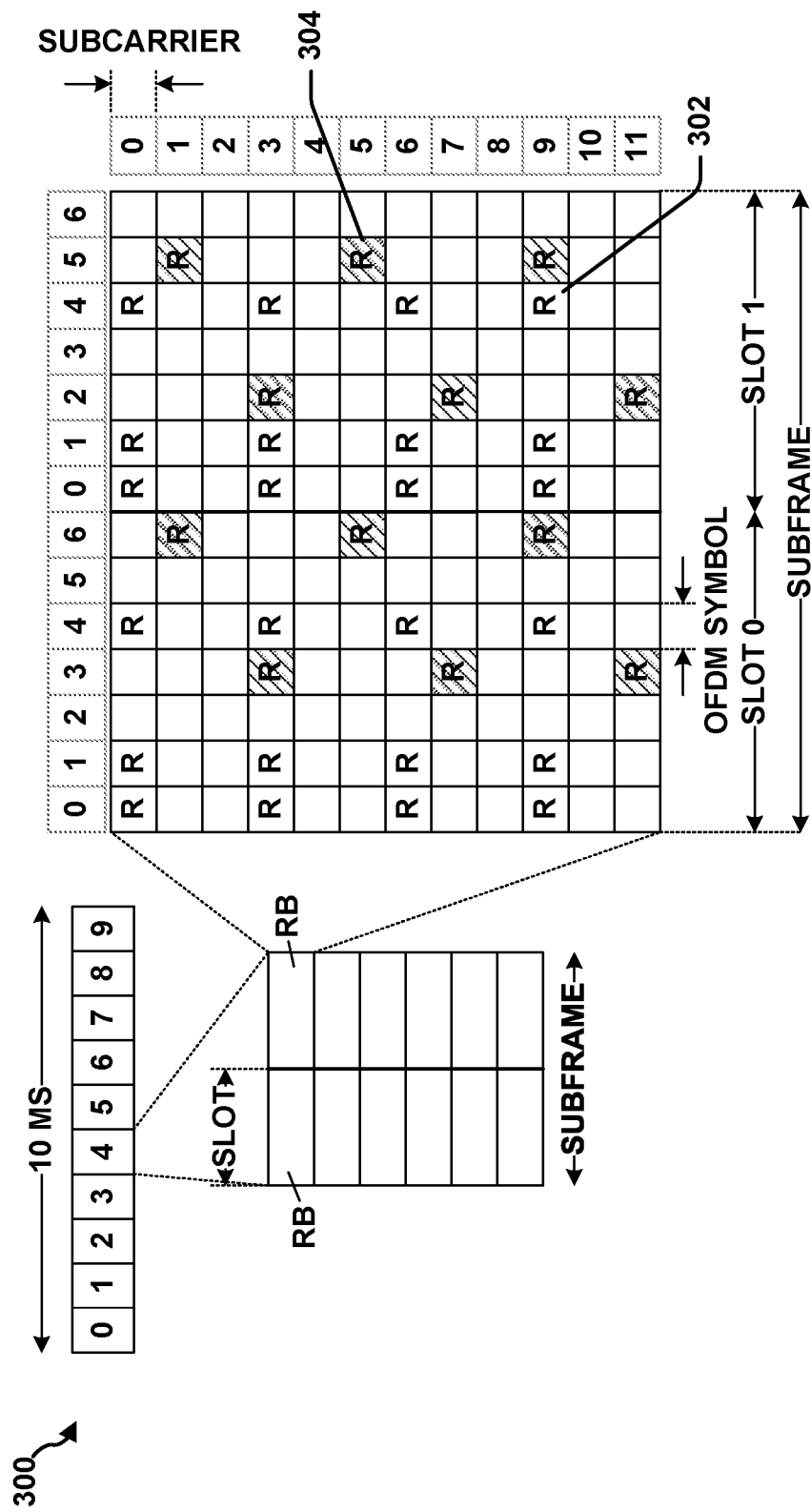
FIG. 3 is a diagram illustrating an example of a DL frame structure in LTE.

FIG. 3 is a diagram 300 illustrating an example of a DL frame structure in LTE, which, in some examples, may be utilized in conjunction with the downlink frame structure provided by the present disclosure. A frame (10 ms) may be divided into 10 equally sized sub-frames. Each sub-frame may include two consecutive time slots. A resource grid may be used to represent two time slots, each time slot including a resource element block. The resource grid is divided into multiple resource elements. In LTE, a resource element block may contain 12 consecutive subcarriers in the frequency domain and, for a normal cyclic prefix in each OFDM symbol, 7 consecutive OFDM symbols in the time domain, or 84 resource elements. For an extended cyclic prefix, a resource element block may contain 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource element blocks upon which the corresponding PDSCH is mapped. The number of bits carried by each resource element depends on the modulation scheme. Thus, the more resource element blocks that a UE receives and the higher the modulation scheme, the higher the data rate for the UE.

Figure 4:
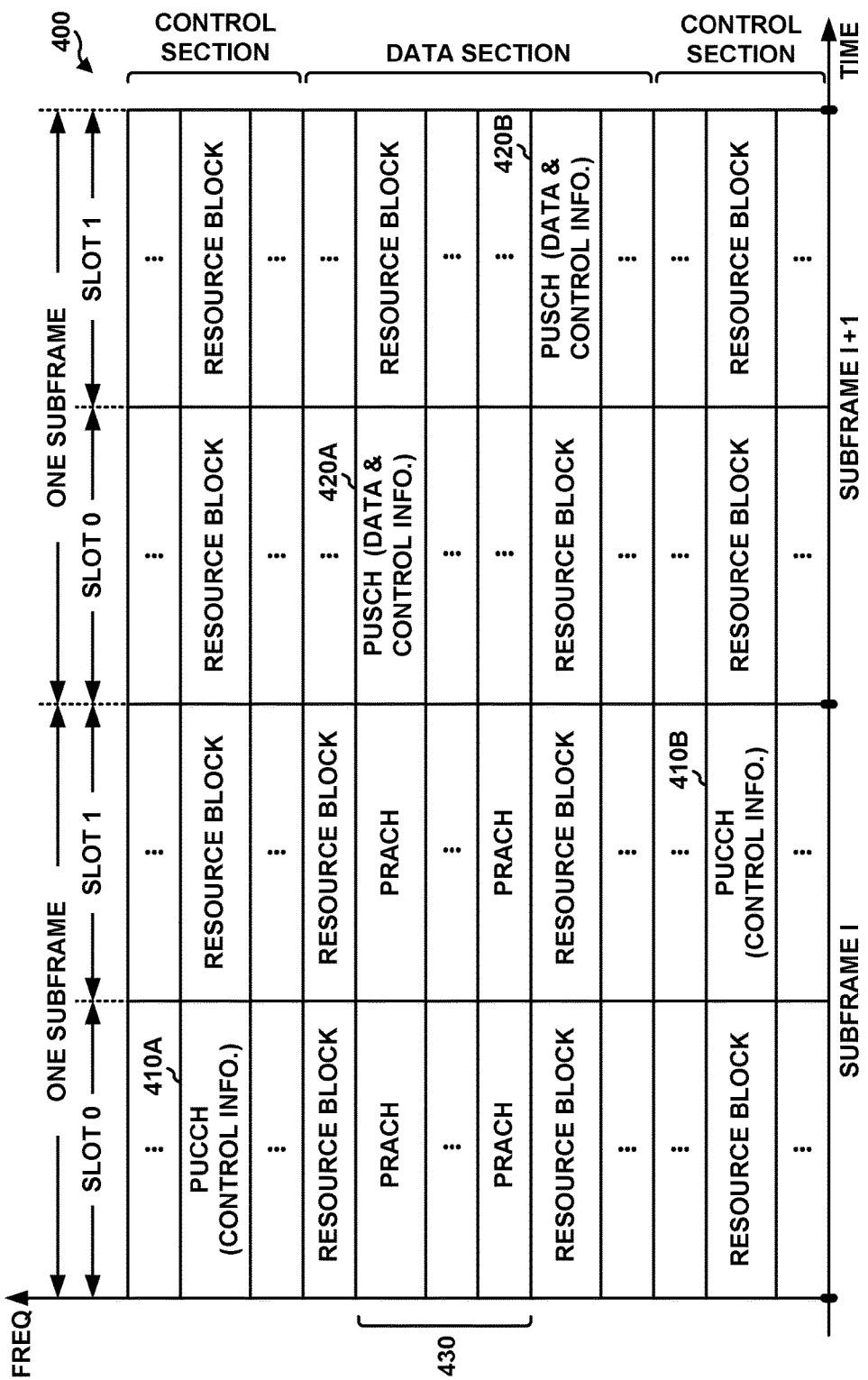
FIG. 4 is a diagram illustrating an example of an UL frame structure in LTE.

FIG. 4 is a diagram 400 illustrating an example of an UL frame structure in LTE. The available resource element blocks for the UL may be partitioned into a data section and a control section. The control section may be formed at the two edges of the system bandwidth and may have a configurable size. The resource element blocks in the control section may be assigned to UEs for transmission of control information. The data section may include all resource element blocks not included in the control section. The UL frame structure results in the data section including contiguous subcarriers, which may allow a single UE to be assigned all of the contiguous subcarriers in the data section.

A UE may be assigned resource element blocks 410a, 410b in the control section to transmit control information to an eNB. The UE may also be assigned resource element blocks 420a, 420b in the data section to transmit data to the eNB. The UE may transmit control information in a physical UL control channel (PUCCH) on the assigned resource element blocks in the control section. The UE may transmit only data or both data and control information in a physical UL shared channel (PUSCH) on the assigned resource element blocks in the data section. A UL transmission may span both slots of a subframe and may hop across frequency.

A set of resource element blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource element blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
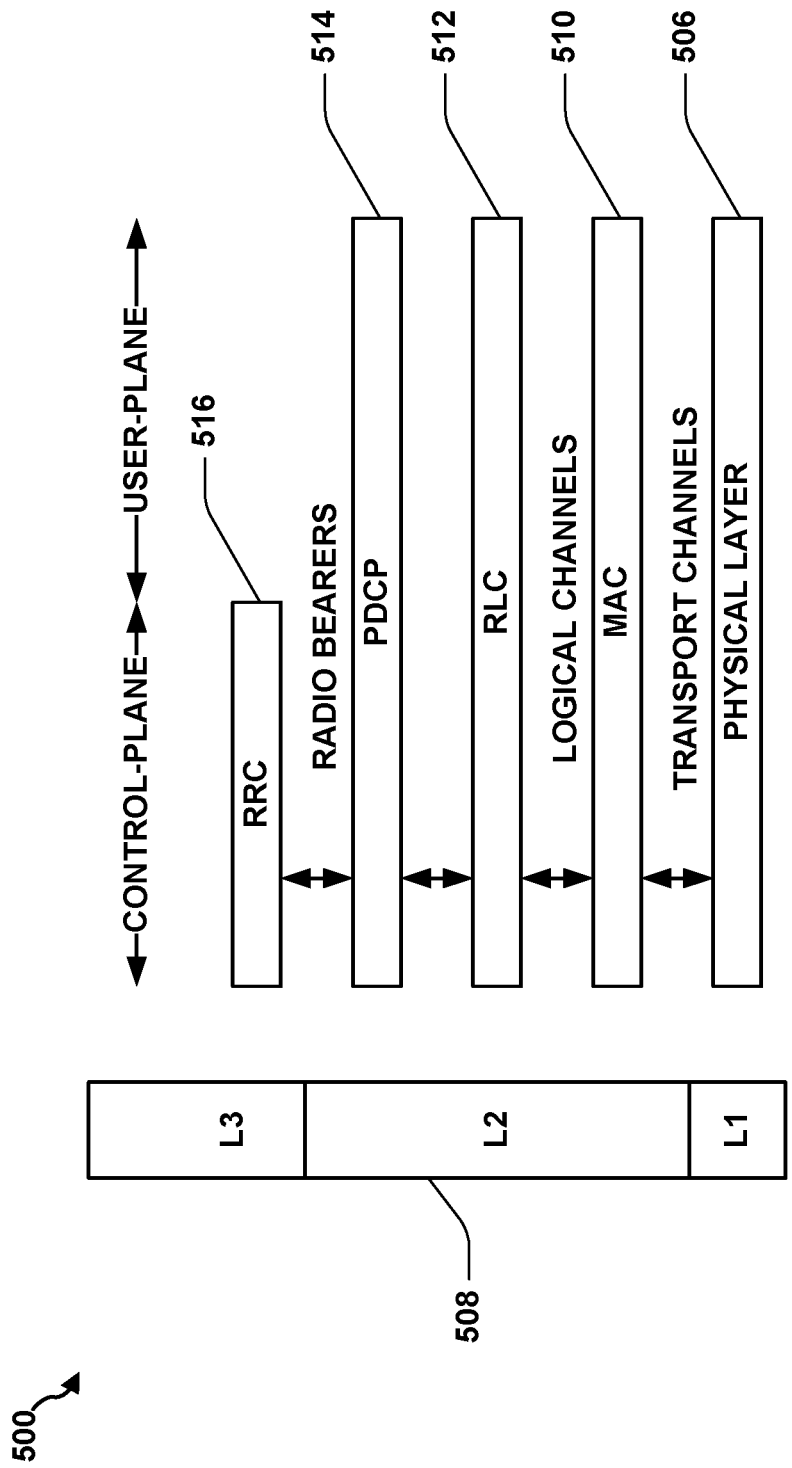
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARD). The MAC sublayer 510 provides multiplexing between logical and transport channels. The MAC sublayer 510 is also responsible for allocating the various radio resources (e.g., resource element blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
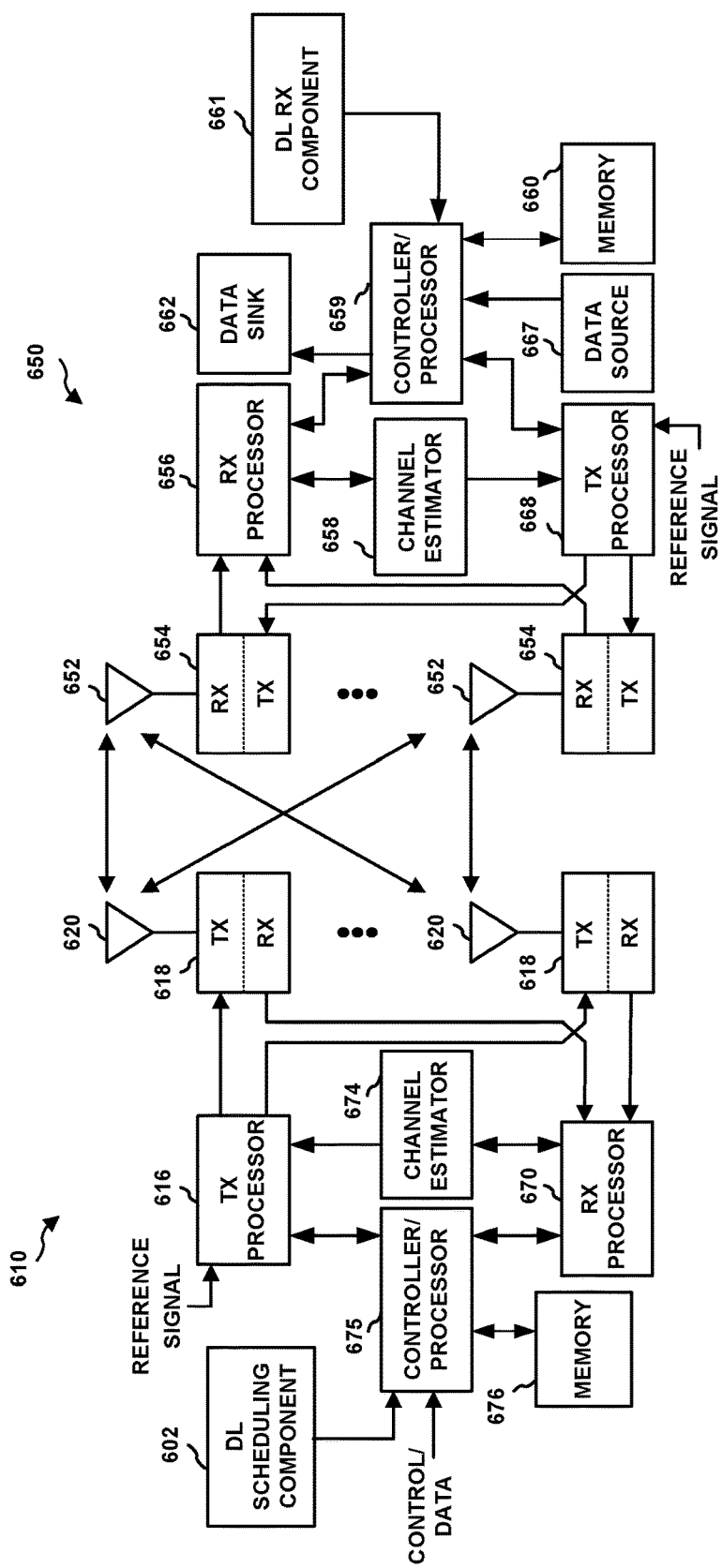
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission. In addition, eNB 610 may include a downlink scheduling component 602 configured to expedite communication of control information and user data with the number of UEs 115 using a data structure, for example but not limited to data structure 700 of FIG. 7, which may include a TTI of one slot for some RE groups.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations. In addition, UE 650 may include a downlink management component 661 configured to receive, decode and operate using the data structure of the present disclosure.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

Figure 7:
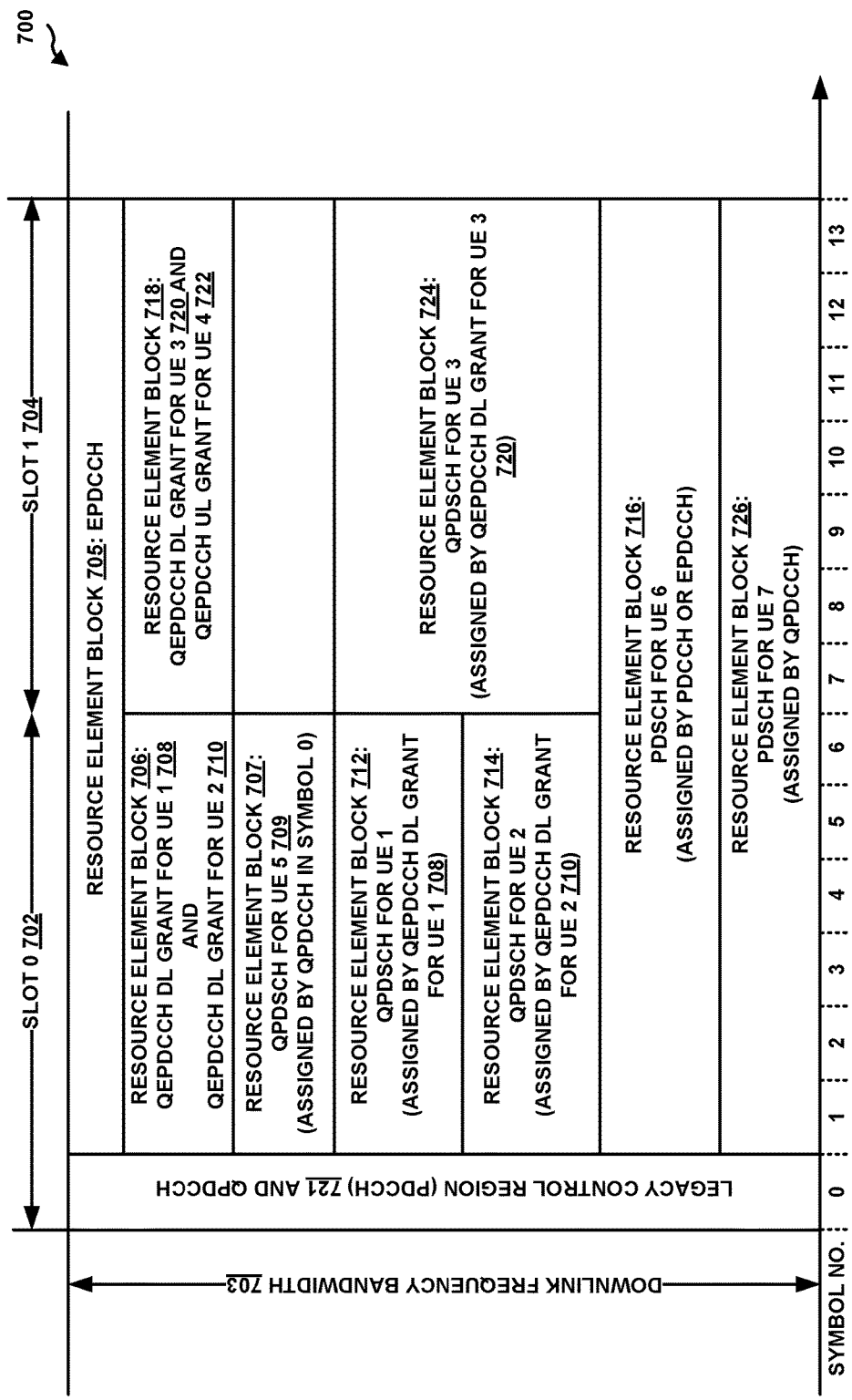
FIG. 7 is a diagram illustrating an example data structure for downlink resource element block allocation according to the present disclosure.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations. In addition, controller/processor may be in communication with a FIG. 7 is a diagram illustrating a non-limiting example of a data structure 700 for managing expedited UE communications in a wireless communications system. In an aspect, data structure 700 includes frame scheduling for an example LTE subframe, which is divided in the time domain (horizontally) into two slots (slot 0 702 and slot 1 704) and 14 symbols (symbols 0-13). Furthermore, the temporal duration (horizontal axis) of some resource element blocks of data structure 700 may be one slot (0.5 ms TTI), whereas other resource element blocks may have a temporal duration of both slots (1 ms TTI). As such, by incorporating control and data channel resource element blocks having a TTI of one slot (0.5 ms), data structure 700 allows for lower latency for downlink data transmissions relative to, for example, resource element blocks of legacy LTE downlink data structures, which have a mandated downlink data resource element block TTI of one subframe (1 ms). Furthermore, data structure 700 provides for inter-operability with these existing legacy LTE data structures by allowing PDCCH, EPDCCH, and PDSCH resource element blocks to be scheduled along with the single-slot resource element blocks introduced by the present disclosure.

In an aspect of the present disclosure, data structure 700 may include one or more resource element blocks that each comprise one or more resource elements into which a downlink frequency bandwidth 703 is divided. For example, in example data structure 700, slot 0 702 contains seven separate resource element blocks: resource element blocks 705, 706, 707, 712, 714, 716, and 726. Furthermore, each of the resource element blocks of data structure 700 may span a single slot or both slots. For example, again referencing the resource elements of slot 0 702, resource element blocks 706, 707, 712, and 714 span one slot (slot 0 702), whereas resource element blocks 705, 716, and 726 span both slots of the subframe (slot 0 702 and slot 1 704). In an aspect, the resource element blocks of example data structure 700 that span one slot may correspond to a Quick LTE channel of the present disclosure having a one-slot TTI, which may include a QEPDCCH (control channel) or a QPDSCH (data channel). Alternatively, the resource element blocks that span both subframes may correspond to a PDSCH (legacy LTE data channel), which may be granted to a particular UE by a PDCCH (e.g., in a legacy control region 721), a QPDCCH (shown in data structure 700 as comprising one or more resource elements of symbol number 0 of slot 0 702), or a EPDCCH (e.g., in resource element block 705). In addition, a resource element block that spans both subframes may correspond to an EPDCCH (legacy LTE control channel), such as resource element block 705.

In an additional aspect, each of the one or more resource element blocks may comprise a control channel region or a data channel region. For example, resource element blocks associated with a QPDCCH (e.g., located in symbol 0 of slot 0 702), a QEPDCCH (e.g., resource element blocks 706 and 718), an EPDCCH (e.g., resource element block 705), or a PDCCH (e.g., located within legacy control region 721) may each correspond to control channel regions. Alternatively, resource element blocks associated with a PDSCH (e.g., resource element block 716) or a QPDSCH (e.g., resource element blocks 712, 714, and 724) may correspond to data channel regions.

In addition, the one or more control channel regions of the data structure 700 may include one or more resource grants for one or more UEs served by one or shared downlink data channels. These downlink data channels may include a QPDSCH spanning a single slot of the subframe and/or a PDSCH spanning both slots of the subframe.

In an aspect, one or more of the control channel regions of the data structure 700 may correspond to a control channel that spans a single slot of the subframe (e.g., one of slot 0 702 or slot 1 704). Such a single-slot control channel of the present disclosure may be referred to herein as QEPDCCH, which may have similar aspects to those of the legacy EPDCCH. However, unlike the EPDCCH, which spans both slots of a subframe (see resource element block 705), the QEPDCCH spans a single slot of the subframe (see resource element blocks 706 and 718). In an aspect, the QEPDCCH may utilize the same or similar enhanced control channel elements (ECCE) resource elements as legacy EPDCCH, although resource elements may be added relative to the legacy EPDCCH to compensate for the shorter QEPDCCH timeframe. In other words, the aggregation level of the QEPDCCH may be increased relative to the legacy EPDCCH (e.g., by a factor of two) to maintain similar coverage.

Furthermore, control channel regions of data structure 700 allocated to the QEPDCCH may include one or more uplink or downlink grants. For example, resource element block 718, which is allocated to the QEPDCCH, includes both a downlink resource grant 720 for a UE 3 (for single-slot resource element block 724) and an uplink resource grant 722 for a UE 4 (for a subsequent subframe). QEPDCCH resource element block 706, on the other hand, does not contain an uplink resource grant, but contains two downlink resource grants: downlink resource grant 708 for UE 1 (for single-slot resource element block 712) and downlink resource grant 710 for UE 2 (for single-slot resource element block 714).

In an additional aspect of the present disclosure, a control channel region of data structure 700 may include a downlink channel grant for a data channel region resource element block that spans both slot 0 702 and slot 1 704 of the subframe. For example, resource element block 705 carries EPDCCH control data that may include a downlink grant for a legacy PDSCH channel data channel region that spans both slots, such as resource element block 716. Alternatively, the data resource grant for resource element block 716 may be carried by a PDCCH of legacy control region 721, which may contain resource elements for a legacy LTE control channel (e.g., PDCCH). In an aspect, although shown as spanning a single initial symbol 0 of the subframe, legacy control region 721 may alternatively span a plurality of initial symbols of the subframe.

Moreover, although the initial symbol (or symbols) of the subframe may contain the legacy control region 721, the symbol may also contain resource elements for a QPDCCH channel of the present disclosure. Accordingly, the QPDCCH may utilize the control channel element (CCE) structure of the legacy PDCCH and may be fully multiplexed with other legacy control channels of legacy control region 721. Furthermore, the QPDCCH may include one or more downlink resource grants for resource element blocks spanning either one or both slots of the subframe. In other words, the QPDCCH may include downlink resource grants for QPDSCH resource element blocks (spanning a single slot of the subframe, 0.5 ms TTI) or PDSCH resource element blocks (spanning both slots of the subframe, 1 ms TTI). For example, the QPDCCH may include a downlink resource grant for resource element block 707, which includes a QPDSCH downlink transmission allocation for a UE 5. Likewise, the QPDCCH may include a downlink resource grant for resource element block 726, which includes a PDSCH downlink transmission allocation for a UE 7. In an additional aspect, as the QPDCCH may include downlink grants for resource element blocks for the single-slot QPDSCH or for the full-subframe PDCCH, the QPDCCH may include a downlink control indicator (DCI) that specifies whether a downlink channel grant is for a single slot or for a full subframe. Furthermore, though not explicitly shown in data structure 700, like the legacy LTE PDCCH, the QPDCCH may include uplink grants in addition to downlink grants.

Furthermore, the resource element blocks that comprise data channel regions may correspond to resource element allocations for downlink transmission of user data to one or more UEs. In an aspect, these data channel regions may include resource element blocks allocated to downlink channels that transmit the user data over a single-slot (e.g., QPDSCH resource element blocks 707, 712, 714, and 724) or downlink channels that transmit the user data over both slots of the subframe (e.g., PDSCH resource element blocks 716 and 726.

Therefore, as illustrated in FIG. 7, data structure 700 includes a Quick LTE downlink resource element allocation structure for some resource element blocks that may implement a slot-based allocation scheme, thereby shortening (e.g. halving) the TTI relative to full-subframe-based legacy LTE downlink resource element allocation schemes. By utilizing this Quick LTE downlink resource element allocation structure, over-the-air latency may be significantly reduced (e.g., by a factor of two). Accordingly, a round-trip time (RTT) of a HARQ process using the Quick LTE structure may be reduced to 4 ms from the 8 ms RTT of the legacy LTE RTT.

In an additional feature, data structure 700 may allocate resource elements in a downlink subframe for UEs that utilize one or both of (a) the Quick LTE channels of the present disclosure that span a single slot and may have a 0.5 ms TTI (e.g., QPDCCH, QEPDCCH, QPDSCH) and (b) legacy LTE channels that span the entire subframe and may therefore have a 1 ms TTI. In addition, because data structure 700 mirrors the general 1 ms subframe structure of legacy LTE, introducing the Quick LTE structure does not alter basic communication operations, such as, but not limited to, cell search procedures, system information block reading, random access channel (RACH) procedures (with media access channel (MAC) enhancements for contention-based RACH, paging, and idle mode procedures. Furthermore, UEs may easily indicate whether they support the Quick LTE communication during connection setup (e.g., via a dedicated information element or message), and in response, a network entity (e.g., an eNB) may provide the configuration parameters for the Quick LTE downlink and uplink channels.

Moreover, in some examples, cell-specific reference signal (CRS)-based demodulation may be utilized for the slot-based resource element allocation of the Quick LTE structure to minimize its specification and implementation impact, as CRS-based demodulation is widely used in legacy LTE systems. Alternatively, demodulation reference signal (DMRS)-based demodulation may be utilized. DMRS-based demodulation can allow for sufficient resources to be used for channel estimation for each slot of a subframe. For example, DMRS allows for increased density, as a UE-specific reference signal (VERS) pattern defined for Time-Division Duplex (TDD) Downlink Pilot Time Slot (DwPTS) can be reused for both slots of a subframe. In addition, DMRS-based demodulation allows for UE combining across consecutive assignments. As both CRS and DMRS-based demodulation are utilized by legacy LTE systems, utilizing these demodulation schemes for Quick LTE communication allows for further increased compatibility.

In addition, by reducing transmission from one subframe of legacy LTE to one slot of the Quick LTE structure of the present disclosure, the amount of resources for data transmission is effectively reduced by half. As such, to facilitate transmission of the same amount of data using the reduced resources available in a single slot, an increase in code rate (e.g., a doubled code rate) may be required. Alternatively or additionally, a number of resource blocks (RBs) (or resource elements) for a resource element block assignment may be increased (e.g., doubled). Therefore, where a resource element block assignment is compressed in time (e.g., changed from a subframe-based TTI to a single slot TTI), the number of resource RBs of the resource element block assignment may expanded. In addition, a two-resource-block minimum assignment may be mandated such that a similar code rate and transport block size can be maintained regardless of TTI size. However, where a one-RB minimum assignment is in place, a transport block size may be scaled by a factor of two. Alternatively, separate mapping rules may be provided for subframe-level (i.e., legacy LTE) assignments versus slot-level assignments (i.e., Quick LTE) with respect to transport block size, modulation and coding scheme (MCS), and resource block size. In addition, slot 0 and slot 1 may have a different mapping or scaling.

In addition, no channel state information (CSI) feedback change is needed relative to legacy LTE for CRS-based demodulation when Quick LTE slot-based resource element block assignment structures are utilized because the same feedback is provided regardless of transmission length or TTI. However, when generating the data structure 700, an eNB may account for the total number of available resource elements to perform a mapping operation that includes selecting resource block assignments, MCS selection, and the like.

Moreover, in some examples, the same subframe-level channel state information reference signal (CSI-RS) and interference measurement resource (IMR) may be used regardless of the TTI of a resource element block (i.e., same for both Quick LTE and legacy LTE assignments). Alternatively, an eNB may generate a configuration whereby a CSI-RS and/or IMR are provided on a per-slot basis to provide greater granularity for slot-level assignments of Quick LTE.

Therefore, the data structure 700 of the present disclosure reduces over-the-air LTE latency by reducing the TTI interval of downlink channels while maintaining backward compatibility and coexistence with channels that utilize legacy LTE scheduling structures.

Figure 8:
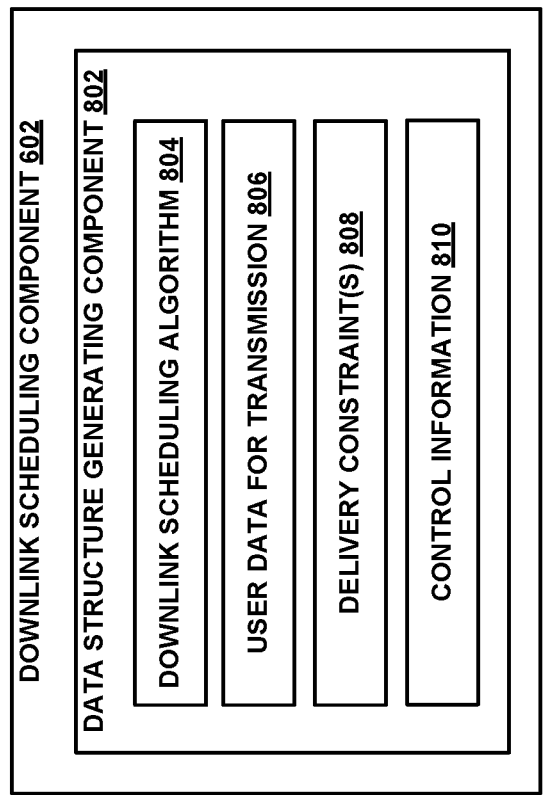
FIG. 8 is a diagram illustrating a downlink scheduling component configured to implement aspects of the present disclosure.

FIG. 8 is a block diagram containing a plurality of sub-components of a downlink scheduling component 602 (see FIG. 6), which may be implemented by a network entity (e.g., an eNodeB) for scheduling expedited downlink transmissions (e.g., on a per-slot basis) of control information and/or user data to one or more UEs, for example, to reduce latency in an LTE system. Downlink scheduling component 602 may include a data structure generating component 802, which may be configured to generate a data structure that manages downlink resource allocation for transmission of control information 810 and/or user data 806 to one or more UEs. In an aspect, the generated data structure may include any data structure described in the present disclosure, such as data structure 700 of FIG. 7.

In an aspect, data structure generating component 802 may be configured to utilize a downlink scheduling algorithm 804, which may be configured to perform scheduling of user data for transmission 806 in the data structure according to the methodologies and structures defined herein. For example, in some examples, downlink scheduling algorithm may maintain one or more look-up tables or maps that define transport block size, MCS, number of resource blocks, etc. for resource element block allocations having a single-slot TTI and for resource element block allocations having full-subframe TTIs. In addition, the data structure generating component 802 may include or otherwise obtain or identify one or more delivery constraints 808 associated with the user data for transmission 806 and/or one or more UEs to which the user data for transmission 806 is to be transmitted. In an aspect, such delivery constraints 808 may include downlink channel frequency bandwidth constraints (e.g., available resource blocks), QoS constraints, latency requirements, radio conditions, such as may be reported via a CSI message, an amount of data in a transmit queue for a UE, an amount of data for retransmission, e.g., due to operation of one or more HARQ processes, or any other constraint imposed by a particular UE, application, associated data, or network operation.

The data structure generating component 802 may utilize the downlink scheduling algorithm 804, which may take at least the delivery constraints 808 and the user data for transmission 806 as input parameters, to generate the data structure to optimize scheduling of the user data for transmission 806 to the one or more UEs, for example, such that the data is transmitted with a TTI of one slot or a TTI of one subframe, depending on the particular resource element block to be assigned.

Figure 9:
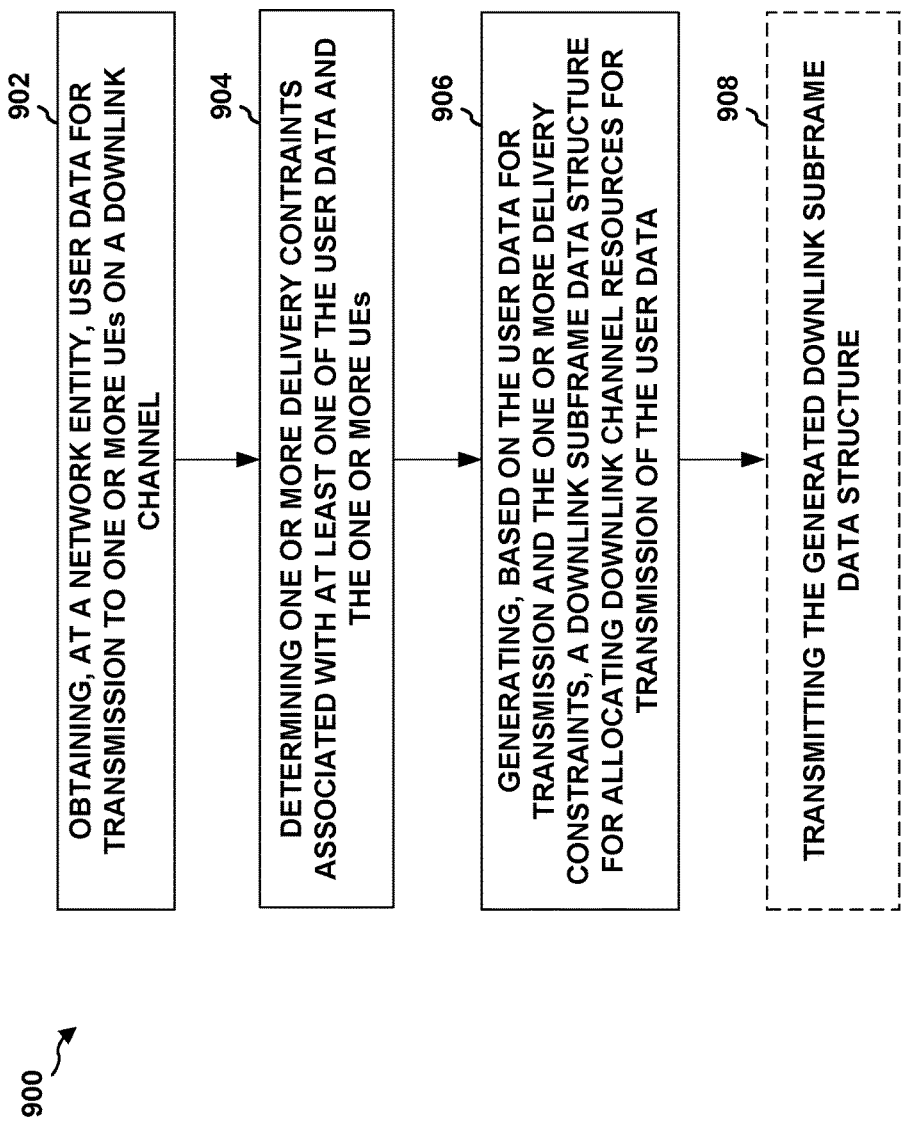
FIG. 9 is a flow chart of a method of wireless communication.

FIG. 9 illustrates an example method 900 of the present disclosure, which may be performed by a network entity (e.g., an eNodeB) that supports Quick LTE and/or legacy LTE or a component of the network entity, such as, but not limited to, downlink scheduling component 602 of FIG. 6 and FIG. 8. For example, in an aspect, at block 902, method 900 may include obtaining, at a network entity, user data for transmission to one or more UEs on a downlink channel. In some examples, the downlink channel may comprise one or both of a QPDSCH and a PDSCH. For example, in an aspect, an eNodeB may receive one or more data flows, for instance, from one or more network entities (e.g., another eNodeB, an MME, core network entity, or any other network entity) and may maintain or establish one or more radio bearers to one or more UEs to transmit user data from the data flows to the one or more UEs.

Furthermore, at block 904, method 900 may include determining one or more delivery constraints associated with at least one of the data and the one or more UEs. In an aspect, such delivery constraints may include downlink channel frequency bandwidth constraints (e.g., available resource blocks), Quality of Service (QoS) constraints, latency requirements, radio conditions, such as may be reported via a channel state information (CSI) message, an amount of data in a transmit queue for a UE, an amount of data for retransmission, e.g., due to operation of one or more HARQ processes, or any other constraint imposed by a particular UE, application, associated data, or network operation.

In addition, at block 906, method 900 may include generating, based on the user data for transmission and the one or more delivery constraints, a downlink subframe data structure for allocating downlink channel resources for transmission of the data. In an aspect, the data structure may include any data structure described in the present disclosure, such as data structure 700 of FIG. 7. As such, the downlink subframe data structure at block 906 may include a downlink subframe comprising two slots and including one or more quick downlink channels having a single-slot transmission time interval. In an aspect, the quick downlink channels may correspond to the Quick LTE channels described in the present disclosure. In addition, the data structure may include one or more resource element blocks each comprising one or more resource elements into which a frequency bandwidth is divided within one or both of the two slots. Additionally, each of the one or more resource element blocks may include a control channel region or a data channel region. Moreover, the data structure may include one or more resource grants, located within one or more control channel regions, for one or more user equipment served by the one or more quick downlink channels. Optionally (as indicated by the dashed lines), at block 908, method 900 may include transmitting the generated data structure, for example, to one or more UEs.

In addition, although not explicitly shown in FIG. 9, method 900 may include one or more alternative or additional features. For example, method 900 may include increasing an aggregation level associated with the one or more quick downlink channels, for example, relative to channels having a full-subframe TTI. In addition, method

900 may include doubling a transport block size associated with the user data where the one or more resource element blocks of the quick downlink channel corresponding to the user data comprises a single resource block.

Furthermore, additional features of method 900 may be related to a HARQ process that may be associated with Quick LTE communications and may have a HARQ response time of about 4 ms or any other time less than that of a legacy LTE HARQ response. For example, method 900 may further comprise maintaining a HARQ process with an expedited retransmission time, wherein the expedited retransmission time is about 4 ms.

Figure 10:
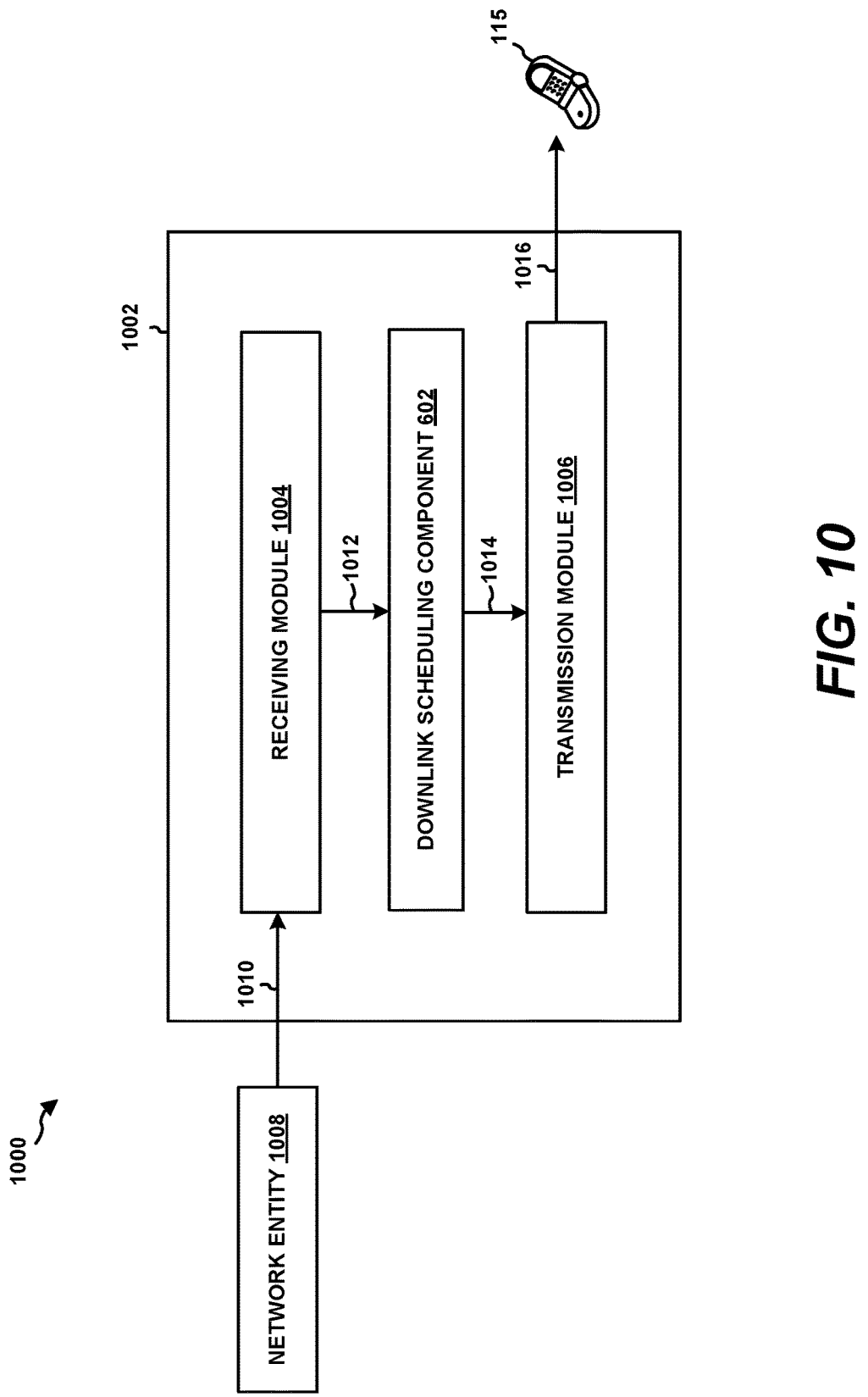
FIG. 10 is a conceptual data flow diagram illustrating the data flow between different modules/means/components in an exemplary apparatus.

FIG. 10 is a conceptual data flow diagram 1000 illustrating the data flow between different modules/means/components in an exemplary apparatus 1002. The apparatus 1002 may be an access point (such as an eNodeB (eNB)), which may include access point 105 of FIG. 1, macro eNB 204 or low power class eNB 208 of FIG. 2, or eNB 610 of FIG. 6. The apparatus includes a receiving module 1004, downlink scheduling component 602 (and its related data structure generating component 802 (see, e.g., FIG. 8)), and a transmission module 1006 that is configured to transmit at least a data structure (e.g., data structure 700 of FIG. 7) and/or user data for transmission 806 to one or more UEs 115.

The receiving module 1004, downlink scheduling component 602 (and the subcomponents thereof in FIG. 6), or the transmission module 1006 may perform one or more aspects of the aforementioned method 900 of FIG. 9. For instance, receiving module 1004 may be configured to receive user data 1010 from one or more other network entities 1008 in one or more data flows. The receiving module 1004 may forward the user data 1010 to the downlink scheduling component 602, and as such, the downlink scheduling component 602 may obtain the forwarded user data 1012. The downlink scheduling component 602 may determine one or more delivery constraints associated with at least one of the user data 1012 and the one or more UEs 115 and may generate a downlink subframe data structure for allocating downlink channel resources for transmission of the user data 1012. The downlink scheduling component 602 may send the downlink subframe data structure and the user data (together, 1014) to the transmission module 1006. The transmission module 1006 may be configured to transmit at least the downlink subframe data structure and the user data (together, 1016) to the one or more UEs 115.

In addition, the apparatus 1002 may include additional modules that perform each of the steps of method 900 of FIG. 9. As such, each step of method 900 may be additionally or alternatively performed by an additional module and the apparatus 1002 may include one or more of those additional modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 11:
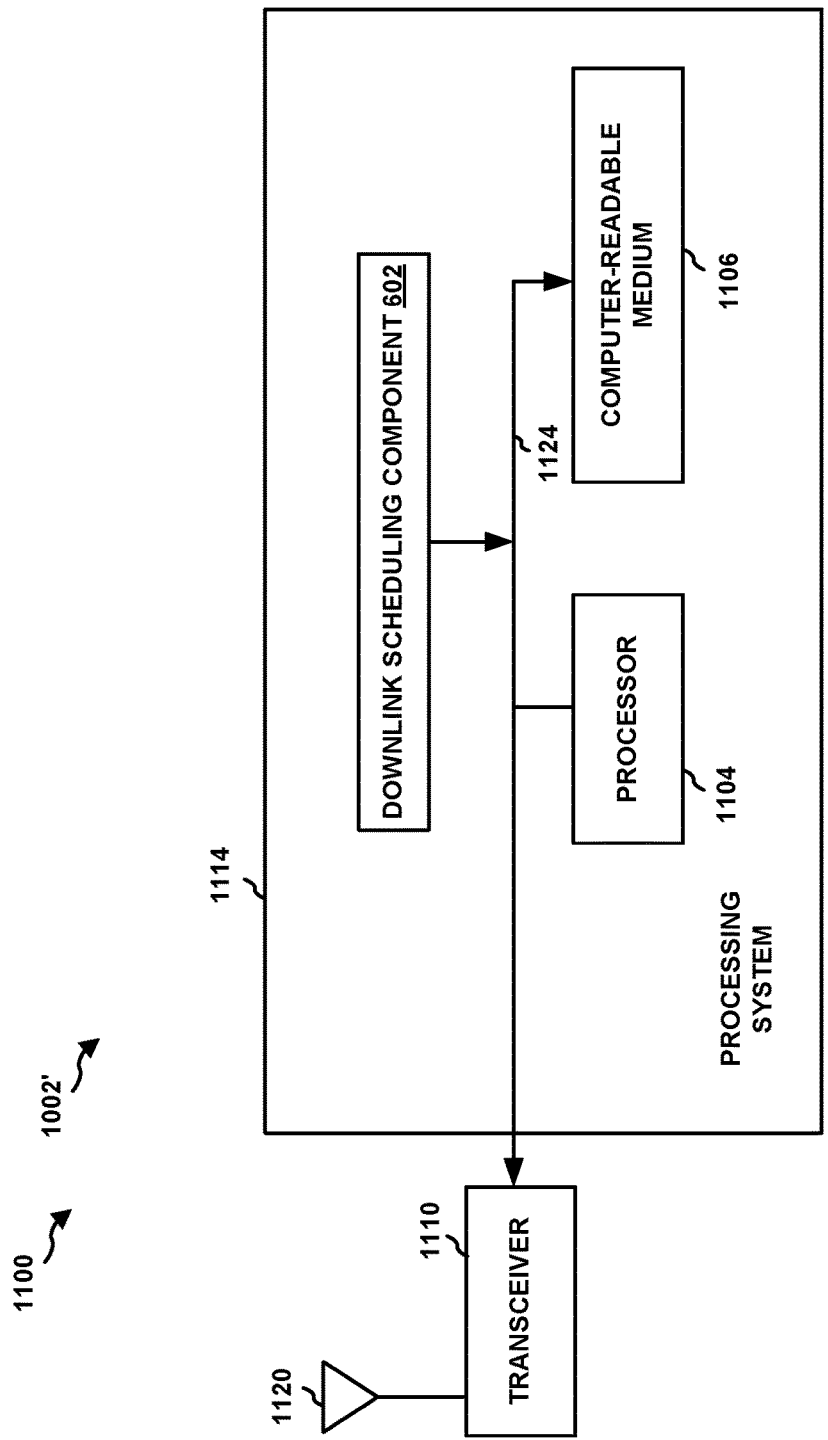
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. Like apparatus 1002 of FIG. 10, apparatus 1002' and/or processing system 1114 may be an access point (such as an eNodeB (eNB)), which may include access point 105 of FIG. 1, macro eNB 204 or low power class eNB 208 of FIG. 2, or eNB 610 of FIG. 6. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware modules, represented by the processor 1104, the downlink scheduling component 602 and its related data structure generating component 802 (see, e.g., FIG. 8), and the computer-readable medium 1106. The bus 1124 may also link various other circuits such as timing sources, peripherals, voltage regulators, and power management circuits, which are well known in the art, and therefore, will not be described any further.

The processing system 1114 may be coupled to a transceiver 1110, which, in some examples, may include receiving module 1004 and transmission module 1006 of FIG. 10. The transceiver 1110 is coupled to one or more antennas 1120. The transceiver 1110 provides a means for communicating with various other apparatus over a transmission medium. In addition, the transceiver 1110 may be configured to transmit a data structure and/or user data for transmission to one or more UEs. The processing system 1114 includes a processor 1104 coupled to a computer-readable medium 1106. The processor 1104 is responsible for general processing, including the execution of software stored on the computer-readable medium 1106. The software, when executed by the processor 1104, causes the processing system 1114 to perform the various functions described supra for any particular apparatus. The computer-readable medium 1106 may also be used for storing data that is manipulated by the processor 1104 when executing software. The processing system further includes at least one of downlink scheduling component 602 and its related data structure generating component 802 (see, e.g., FIG. 8). The modules/components may be software modules running in the processor 1104, resident/stored in the computer-readable medium 1106, one or more hardware modules coupled to the processor 1104, or some combination thereof. The processing system 1114 may be a component of the eNB 610 and may include the memory 676 and/or at least one of the TX processor 616, the RX processor 670, and the controller/processor 675.

In one configuration, the apparatus 1002' for wireless communication includes means for obtaining user data for transmission 806 to one or more UEs on a downlink channel; means for determining one or more delivery constraints 808 associated with at least one of the data and the one or more UEs; and means for generating, based on the user data for transmission 806 and the one or more delivery constraints 808, a downlink subframe data structure for allocating downlink channel resources for transmission of the user data for transmission 806. The aforementioned means may be one or more of the aforementioned modules of the apparatus 1002 and/or the processing system 1114 of the apparatus 1002' configured to perform the functions recited by the aforementioned means. As described supra, the processing system 1114 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

Figure 12:
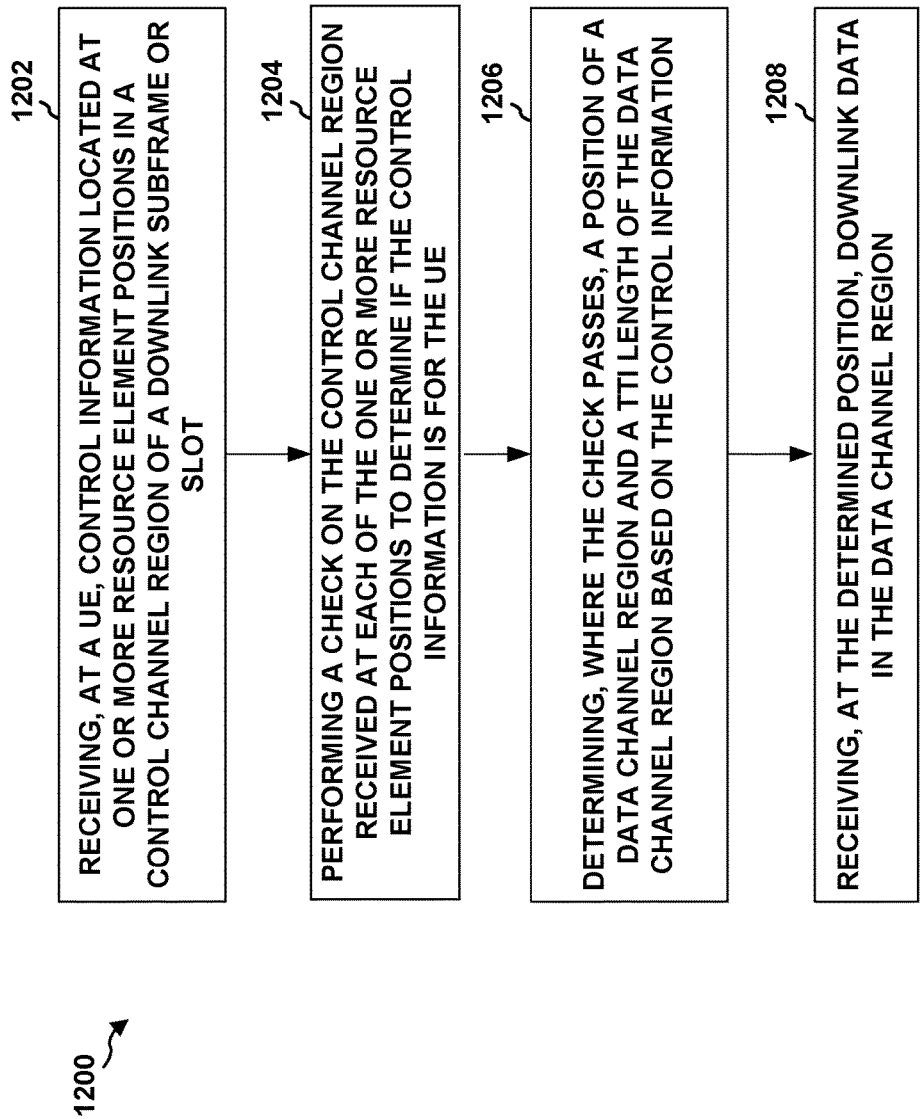
FIG. 12 is a flow chart of a method of wireless communication.

Furthermore, like method 900, which may be performed by an example eNB of the present disclosure, one or more UEs (e.g., UE 115 of FIG. 1 or UE 115 of FIG. 2) may perform methods related to the LTE data structures presented herein. For instance, FIG. 12 illustrates an example method 1200 of the present disclosure, which may be performed by a UE (e.g., UE 115 of FIGS. 1, 2 and 10) that supports Quick LTE and/or legacy LTE. In an aspect, aspects of method 1200 may be performed by downlink management component 661 (see FIGS. 1, 2, 6) and/or any other component (e.g., controller/processor 659 of FIG. 6) of a UE.

In an aspect, method 1200 may include receiving, at a UE, control information located at one or more resource element positions in a control channel region of a downlink subframe or slot at block 1202. This control channel region may include at least a portion of a downlink data structure (see data structure 700 of FIG. 7) defined by one or more resource elements or resource element blocks. In an aspect, block 1202 may be performed by receiving module 1304 of FIG. 13 or transceiver 1410 of FIG. 14.

In addition, method 1200 may include, at block 1204, performing a check on the control channel region received at each of the one or more resource element positions to determine if the control information is for the UE. In an aspect, this check may include a cyclic redundancy check (CRC). Furthermore, in some examples, block 1204 may be performed by control channel region checking component 1306 of FIG. 13.

In addition, at block 1206, method 1200 may include determining, where the check passes, a position of a data channel region and a TTI length of the data channel region based on the control information. This data channel region may include at least a portion of a downlink data structure (see data structure 700 of FIG. 7) defined by one or more resource elements or resource element blocks. In some examples, block 1206 may be performed by data channel region determining component 1308

Moreover, at block 1208, method 1200 may include receiving, at the determined position, downlink data in the data channel region. In some examples, block 1208 may be performed by receiving module 1304 of FIG. 13 or transceiver 1410 of FIG. 14.

Figure 13:
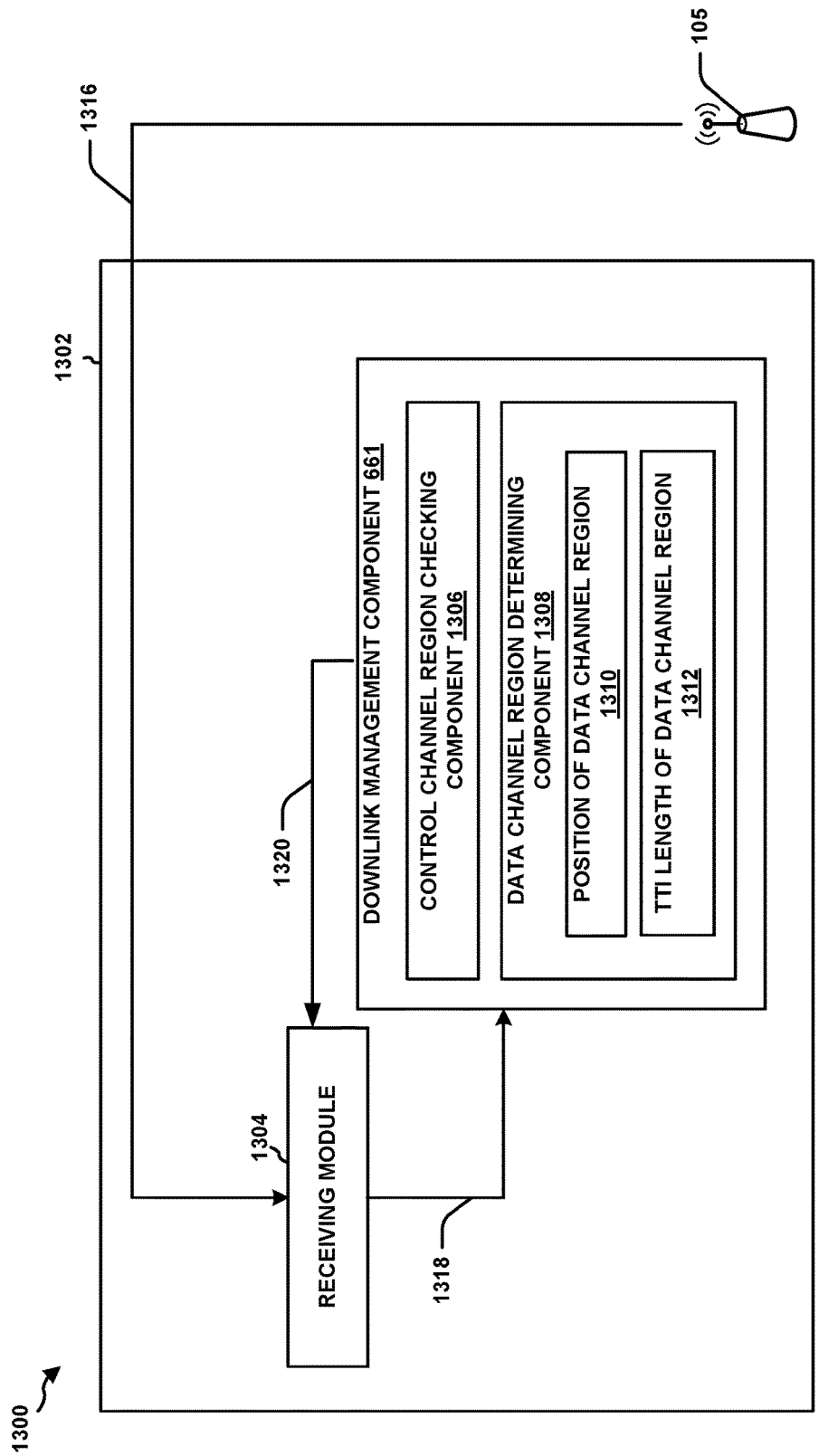
FIG. 13 is a conceptual data flow diagram illustrating the data flow between different modules/means/components in an exemplary apparatus.

In addition, it is understood that the specific order or hierarchy of steps in the methods disclosed in FIGS. 9 and 13 is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

FIG. 13 is a conceptual data flow diagram 1300 illustrating the data flow between different modules/means/components in an exemplary apparatus 1302, which may be a UE (e.g., UE 115 of FIGS. 1, 2, and 10). In an aspect, the apparatus 1302 includes a receiving module 1304 that is configured to receive data 1316, which may include a data structure 700 of FIG. 7 and associated control data received via a control channel and/or downlink data via a data channel. Such data 1316 may be transmitted to apparatus 1302, for example, by a network entity 1303, which may include, but is not limited to, access point 105 of FIG. 1, macro eNB 204 or low power class eNB 208 of FIG. 2, or eNB 610 of FIG. 6, any of which may include downlink scheduling component 602 and its related data structure generating component 802 (see, e.g., FIG. 8). For instance, receiving module 1304 may be configured to receive control information located at one or more resource element positions in a control channel region of a downlink subframe or slot as defined by a received data structure (data structure 700 of FIG. 7). In addition, receiving module 1304 may be configured to receive user data in a data channel region of the received data structure, where the user data is received at a determined position in the received data structure corresponding to a particular frequency band. The receiving module 1304 may send the received data 1318 to the downlink management component 661.

In addition, apparatus 1302 may contain a downlink management component 661 (see FIGS. 1 and 2) and a plurality of sub-components thereof, which may be implemented by apparatus 1302 to decode and process data (e.g., received data 1318) and operate using the data structure 700 of FIG. 7, for example, to reduce latency in an LTE system. Downlink management component 611 may include a control region checking component 1306, which may be configured to perform a check on the control channel region received at each of one or more resource element positions in the received data structure to determine if the control information is for the apparatus 1302. In an aspect, this check may include a CRC.

In addition, downlink management component 661 may include a data channel region determining component 1308, which may be configured to determine, where the check performed by control region checking component 1306 passes, a position of a data channel region 1310 and a TTI length of the data channel region 1312 based on the control information included in the received data structure. This data channel region may include at least a portion of a downlink data structure (see data structure 700 of FIG. 7) defined by one or more resource elements or resource element blocks. In an aspect, the downlink management component 661 may be configured to send the position of the data channel region 1310 and the TTI length of data channel region 1312 to the receiving module 1304, which may utilize this information to receive data 1316 transmitted by access point 105.

The apparatus may include additional modules that perform each of the steps of the algorithm in the aforementioned flow chart of FIG. 12. As such, each step in the aforementioned flow charts of FIG. 12 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 14:
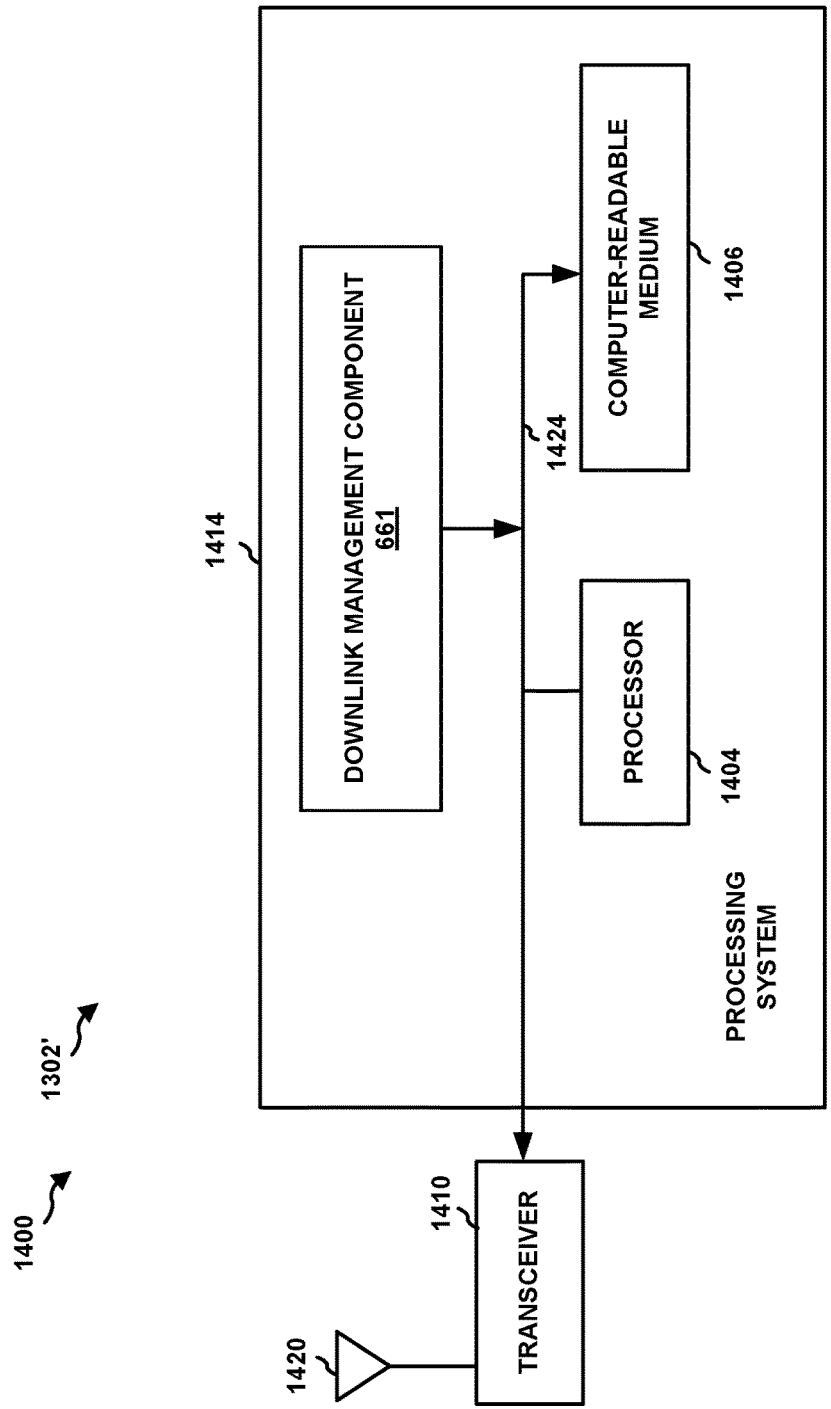
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. Like apparatus 1302 of FIG. 13, apparatus 1302' and/or processing system 1414 may be a UE (e.g., UE 115 of FIGS. 1, 2, and 10). The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware modules, represented by the processor 1404, the downlink management component 611 (see, e.g., FIG. 8), and the computer-readable medium 1406. The bus 1424 may also link various other circuits such as timing sources, peripherals, voltage regulators, and power management circuits, which are well known in the art, and therefore, will not be described any further.

The processing system 1414 may be coupled to a transceiver 1410, which, in some examples, may include receiving module 1304 of FIG. 13. The transceiver 1410 is coupled to one or more antennas 1420. The transceiver 1410 provides a means for communicating with various other apparatus (e.g., access point 105 of FIGS. 1 and 13) over a transmission medium. In addition, the transceiver 1410 may be configured to receive a data structure and/or user data. The processing system 1414 includes a processor 1404 coupled to a computer-readable medium 1406. The processor 1404 is responsible for general processing, including the execution of software stored on the computer-readable medium 1406. The software, when executed by the processor 1404, causes the processing system 1414 to perform the various functions described supra for any particular apparatus. The computer-readable medium 1406 may also be used for storing data that is manipulated by the processor 1404 when executing software. The processing system further includes downlink management component 611 and its related subcomponents (see, e.g., FIG. 13). The modules/components may be software modules running in the processor 1404, resident/stored in the computer-readable medium 1406, one or more hardware modules coupled to the processor 1404, or some combination thereof. The processing system 1414 may be a component of the UE 650 and may include the memory 660 and/or at least one of the TX processor 668, the RX processor 656, and the controller/processor 659 of FIG. 6.

In one configuration, the apparatus 1302' for wireless communication includes means for receiving, at a UE, control information located at one or more resource element positions in a control channel region of a downlink; means for performing a check on the control channel region received at each of the one or more resource element positions to determine if the control information is for the UE; means for determining, where the check passes, a position of a data channel region and a TTI length of the data channel region based on the control information; and means for receiving, at the determined position, downlink data in the data channel region.

The aforementioned means may be one or more of the aforementioned modules of the apparatus 1302' and/or the processing system 1114 configured to perform the functions recited by the aforementioned means. As described supra, the processing system 1114 may include the TX Processor 616, the RX Processor 670, and the controller/processor 675. As such, in one configuration, the aforementioned means may be the TX Processor 616, the RX Processor 670, and the controller/processor 675, or any other component of the present disclosure configured to perform the functions recited by the aforementioned means.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for managing user equipment (UE) communications in a wireless communications system, comprising:
   receiving, at the UE, control information located at one or more resource element positions in a control channel region of a downlink subframe or a slot of the downlink subframe;
   performing a check on the control channel region received at each of the one or more resource element positions to determine whether corresponding control information is for the UE;
   determining, where the check indicates the corresponding control information is for the UE, a position of a data channel region and a transmission time interval (TTI) length of the data channel region, as being less than a temporal length of the downlink subframe, based on the corresponding control information; and
   receiving, at the determined position, downlink data in the data channel region.

2. The method of claim 1, wherein the downlink subframe includes one or more quick downlink channels having a single-slot TTI.

3. The method of claim 2, wherein the downlink subframe further includes one or more legacy downlink channels having a two-slot TTI.

4. The method of claim 1, wherein the control channel region comprises a legacy control channel region that includes all resource elements of a symbol of at least one of two slots of the downlink subframe.

5. The method of claim 1, wherein the control channel region spans one slot of the downlink subframe and includes the control information indicating one or more downlink resource grants for one or more quick downlink channels in the data channel region.

6. The method of claim 1, wherein the control channel region comprises an uplink resource grant for the UE.

7. The method of claim 1, wherein the control channel region spans two slots of the downlink subframe and the control information includes a downlink resource grant corresponding to the data channel region spanning the two slots.

8. The method of claim 1, wherein the downlink subframe comprises:
   two slots and includes one or more quick downlink channels having a single-slot TTI; and
   one or more resource element blocks each comprising one or more resource elements into which a frequency bandwidth is divided within one or both of the two slots, wherein each of the one or more resource element blocks comprises the control channel region or the data channel region corresponding to the one or more quick downlink channels, and
   wherein at least the control channel region is multiplexed, within at least one symbol, with a legacy control channel region.

9. An apparatus for managing user equipment (UE) communications in a wireless communications system, comprising:
   a processor; and
   a memory coupled to the processor, wherein the memory stores processor-executable instructions, that when executed by the processor, cause the processor to:
   receive, at the UE, control information located at one or more resource element positions in a control channel region of a downlink subframe or a slot of the downlink subframe;

perform a check on the control channel region received at each of the one or more resource element positions to determine whether corresponding control information is for the UE;

determine, where the check indicates the corresponding control information is for the UE, a position of a data channel region and a transmission time interval (TTI) length of the data channel region, as being less than a temporal length of the downlink subframe, based on the corresponding control information; and receive, at the determined position, downlink data in the data channel region.

10. The apparatus of claim 9, wherein the downlink subframe includes one or more quick downlink channels having a single-slot TTI.

11. The apparatus of claim 10, wherein the downlink subframe further includes one or more legacy downlink channels having a two-slot TTI.

12. The apparatus of claim 9, wherein the control channel region comprises a legacy control channel region that includes all resource elements of a symbol of at least one of two slots of the downlink subframe.

13. The apparatus of claim 9, wherein the control channel region spans one slot of the downlink subframe and includes the control information indicating one or more downlink resource grants for one or more quick downlink channels in the data channel region.

14. The apparatus of claim 9, wherein the control channel region comprises an uplink resource grant for the UE.

15. The apparatus of claim 9, wherein the control channel region spans two slots of the downlink subframe and the control information includes a downlink resource grant corresponding to the data channel region spanning the two slots.

16. The apparatus of claim 9, wherein the downlink subframe comprises:

two slots and includes one or more quick downlink channels having a single-slot TTI; and one or more resource element blocks each comprising one or more resource elements into which a frequency bandwidth is divided within one or both of the two slots, wherein each of the one or more resource element blocks comprises the control channel region or the data channel region corresponding to the one or more quick downlink channels, and wherein at least the control channel region is multiplexed, within at least one symbol, with a legacy control channel region.

17. An apparatus for managing user equipment (UE) communications in a wireless communications system, comprising:

means for receiving, at the UE, control information located at one or more resource element positions in a control channel region of a downlink subframe or a slot of the downlink subframe;

means for performing a check on the control channel region received at each of the one or more resource element positions to determine whether corresponding control information is for the UE;

means for determining, where the check indicates the corresponding control information is for the UE, a position of a data channel region and a transmission time interval (TTI) length of the data channel region, as being less than a temporal length of the downlink subframe, based on the corresponding control information; and means for receiving, at the determined position, downlink data in the data channel region.

18. The apparatus of claim 17, wherein the downlink subframe includes one or more quick downlink channels having a single-slot TTI and one or more legacy downlink channels having a two-slot TTI.

19. The apparatus of claim 17, wherein the control channel region comprises a legacy control channel region that includes all resource elements of a symbol of at least one of two slots of the downlink subframe.

20. The apparatus of claim 17, wherein the control channel region spans one slot of the downlink subframe and includes the control information indicating one or more downlink resource grants for one or more quick downlink channels in the data channel region.

21. The apparatus of claim 17, wherein the control channel region comprises an uplink resource grant for the UE.

22. The apparatus of claim 17, wherein the control channel region spans two slots of the downlink subframe and the control information includes a downlink resource grant corresponding to the data channel region spanning the two slots.

23. The apparatus of claim 17, wherein the downlink subframe comprises:

two slots and includes one or more quick downlink channels having a single-slot TTI; and one or more resource element blocks each comprising one or more resource elements into which a frequency bandwidth is divided within one or both of the two slots, wherein each of the one or more resource element blocks comprises the control channel region or the data channel region corresponding to the one or more quick downlink channels, and wherein at least the control channel region is multiplexed, within at least one symbol, with a legacy control channel region.

24. A non-transitory computer-readable storage medium comprising computer-executable code for managing user equipment communications in a wireless communications system, the code comprising:

code for receiving, at the UE, control information located at one or more resource element positions in a control channel region of a downlink subframe or a slot of the downlink subframe;

code for performing a check on the control channel region received at each of the one or more resource element positions to determine whether corresponding control information is for the UE;

code for determining, where the check indicates the corresponding control information is for the UE, a position of a data channel region and a transmission time interval (TTI) length of the data channel region, as being less than a temporal length of the downlink subframe, based on the corresponding control information; and code for receiving, at the determined position, downlink data in the data channel region.

25. The non-transitory computer-readable storage medium of claim 24, wherein the downlink subframe includes one or more quick downlink channels having a single- slot TTI and one or more legacy downlink channels having a two-slot TTI.

26. The non-transitory computer-readable storage medium of claim 24, wherein the control channel region comprises a legacy control channel region that includes all resource elements of a symbol of at least one of two slots of the downlink subframe.

27. The non-transitory computer-readable storage medium of claim 24, wherein the control channel region spans one slot of the downlink subframe and includes the control information indicating one or more downlink resource grants for one or more quick downlink channels in the data channel region.

28. The non-transitory computer-readable storage medium of claim 24, wherein the control channel region comprises an uplink resource grant for the UE.

29. The non-transitory computer-readable storage medium of claim 24, wherein the control channel region spans two slots of the downlink subframe and the control information includes a downlink resource grant corresponding to the data channel region spanning the two slots.

30. The non-transitory computer-readable storage medium of claim 24, wherein the downlink subframe comprises:
- two slots and includes one or more quick downlink channels having a single-slot TTI; and
- one or more resource element blocks each comprising one or more resource elements into which a frequency bandwidth is divided within one or both of the two slots, wherein each of the one or more resource element blocks comprises the control channel region or the data channel region corresponding to the one or more quick downlink channels, and wherein at least the control channel region is multiplexed, within at least one symbol, with a legacy control channel region.

* * * * *